(12) United States Patent
Dalli et al.

(10) Patent No.: US 11,468,308 B2
(45) Date of Patent: Oct. 11, 2022

(54) ARCHITECTURE FOR A HARDWARE BASED EXPLAINABLE NEURAL NETWORK

(71) Applicant: UMNAI Limited, Ta' Xbiex (MT)

(72) Inventors: Angelo Dalli, Floriana (MT); Mauro Pirrone, Kalkara (MT)

(73) Assignee: UMNAI Limited, Ta' Xbiex (MT)

( * ) Notice: Subject to any disclaimer, the term of this patent is extended or adjusted under 35 U.S.C. 154(b) by 0 days.

(21) Appl. No.: 17/245,328

(22) Filed: Apr. 30, 2021

(65) Prior Publication Data

US 2021/0342677 A1 Nov. 4, 2021

Related U.S. Application Data

(60) Provisional application No. 63/018,605, filed on May 1, 2020.

(51) Int. Cl.
G06N 3/063 (2006.01)
G06N 3/08 (2006.01)
G06N 3/04 (2006.01)

(52) U.S. Cl.
CPC .......... *G06N 3/063* (2013.01); *G06N 3/0454* (2013.01); *G06N 3/08* (2013.01)

(58) Field of Classification Search
CPC ........ G06N 3/063; G06N 3/0454; G06N 3/08; G06N 3/082; G06N 3/0427
See application file for complete search history.

(56) References Cited

U.S. PATENT DOCUMENTS

| | | | | |
|---|---|---|---|---|
| 9,830,315 | B1* | 11/2017 | Xiao | G06F 40/30 |
| 2018/0122506 | A1* | 5/2018 | Grantcharov | A61B 5/0022 |
| 2019/0370647 | A1* | 12/2019 | Doshi | G06N 3/08 |
| 2020/0076835 | A1* | 3/2020 | Ladnai | H04L 63/0227 |
| 2021/0097132 | A1* | 4/2021 | Dimanov | G06K 9/627 |

OTHER PUBLICATIONS

Spinner T, Schlegel U, Schäfer H, El-Assady M. explAIner: A visual analytics framework for interactive and explainable machine learning. IEEE transactions on visualization and computer graphics. Aug. 20, 2019;26(1):1064-74. (Year: 2019).*

(Continued)

*Primary Examiner* — Michael J Huntley
*Assistant Examiner* — Oluwatosin O Alabi
(74) *Attorney, Agent, or Firm* — Maier & Maier, PLLC

(57) ABSTRACT

Explainable neural networks may be designed to be easily implementable in hardware efficiently, leading to substantial speed and space improvements. An exemplary embodiment extends upon possible hardware embodiments of XNNs, making them suitable for low power applications, smartphones, mobile computing devices, autonomous machines, server accelerators, Internet of Things (IoT) and edge computing applications amongst many other applications. The capability of XNNs to be transformed from one form to another while preserving their logical equivalence is exploited to create efficient, secure hardware implementations that are optimized for the desired application domain and predictable in their behavior.

30 Claims, 9 Drawing Sheets

XNN Architecture

(56) References Cited

OTHER PUBLICATIONS

Guehika A. Triz, a Systematic Approach to Create Quantum Activation Function for Deep Learning's Hidden Layers, in Order to Make AI Explainable with Quantum Computer. InInternational TRIZ Future Conference Oct. 9, 2019 (pp. 371-387). Springer, Cham. (Year: 2019).*
Chen H, Cammarota R, Valencia F, Regazzoni F. Plaidml-he: Acceleration of deep learning kernels to compute on encrypted data. In2019 IEEE 37th International Conference on Computer Design (ICCD) Nov. 17, 2019 (pp. 333-336). IEEE. (Year: 2019).*
Qiumei Z, Dan T, Fenghua W. Improved convolutional neural network based on fast exponentially linear unit activation function. Ieee Access. Oct. 17, 2019;7:151359-67. (Year: 2019).*
Vaughan J, Sudjianto A, Brahimi E, Chen J, Nair VN. Explainable neural networks based on additive index models. arXiv preprint arXiv:1806.01933. Jun. 5, 2018. (Year: 2018).*
Das A, Rad P. Opportunities and challenges in explainable artificial intelligence (xai): A survey. arXiv preprint arXiv:2006.11371. Jun. 16, 2020. (Year: 2020).*
Wang X, Wu P, Liu G, Huang Q, Hu X, Xu H. Learning performance prediction via convolutional GRU and explainable neural networks in e-learning environments. Computing. Jun. 2019;101(6):587-604. (Year: 2019).*

* cited by examiner

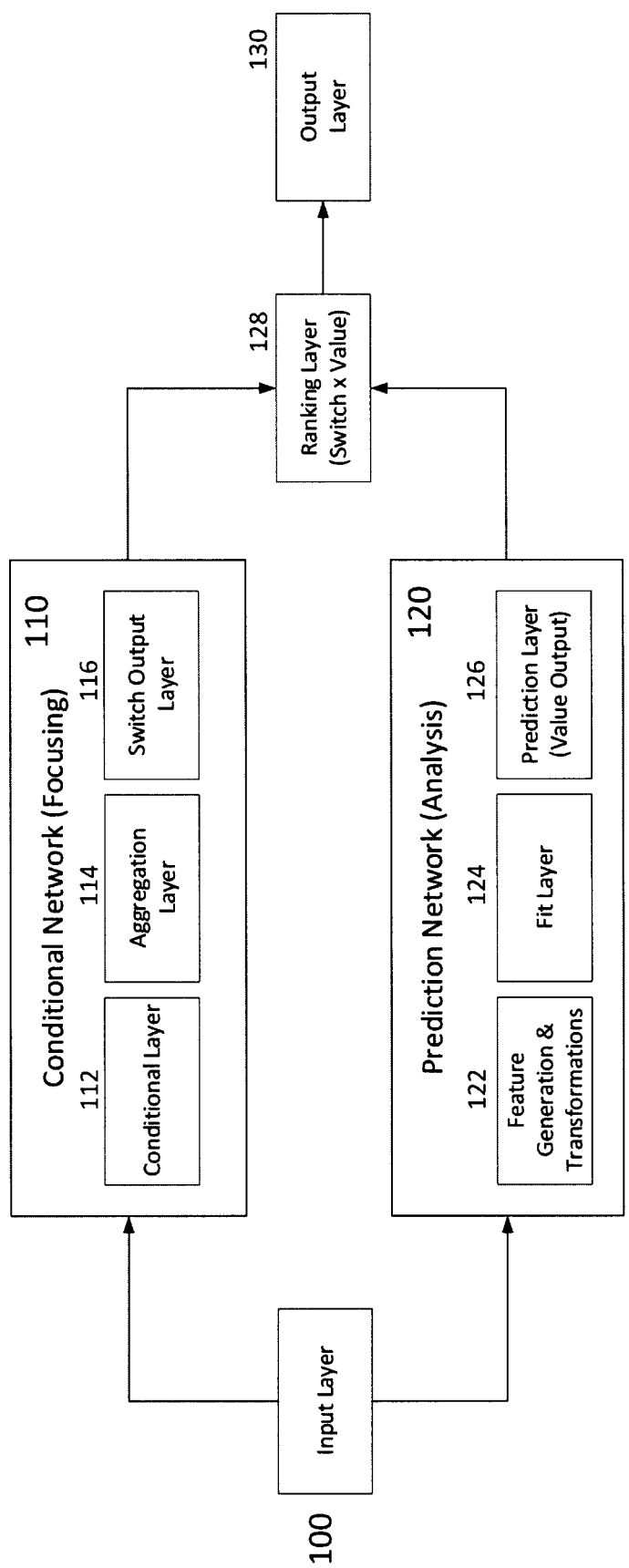
Figure 1 - XNN Architecture

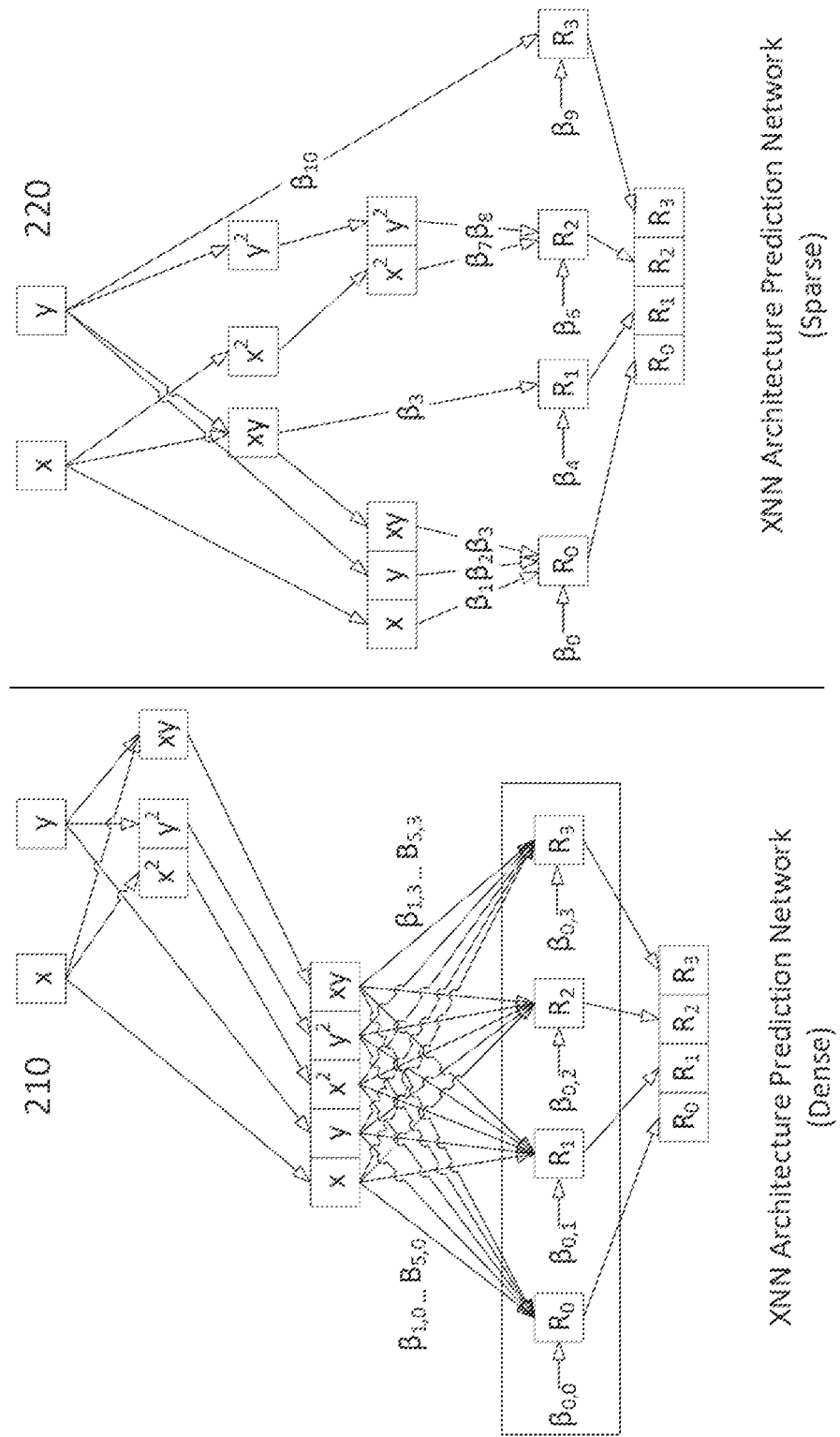
Figure 2 - XNN Architecture Comparison

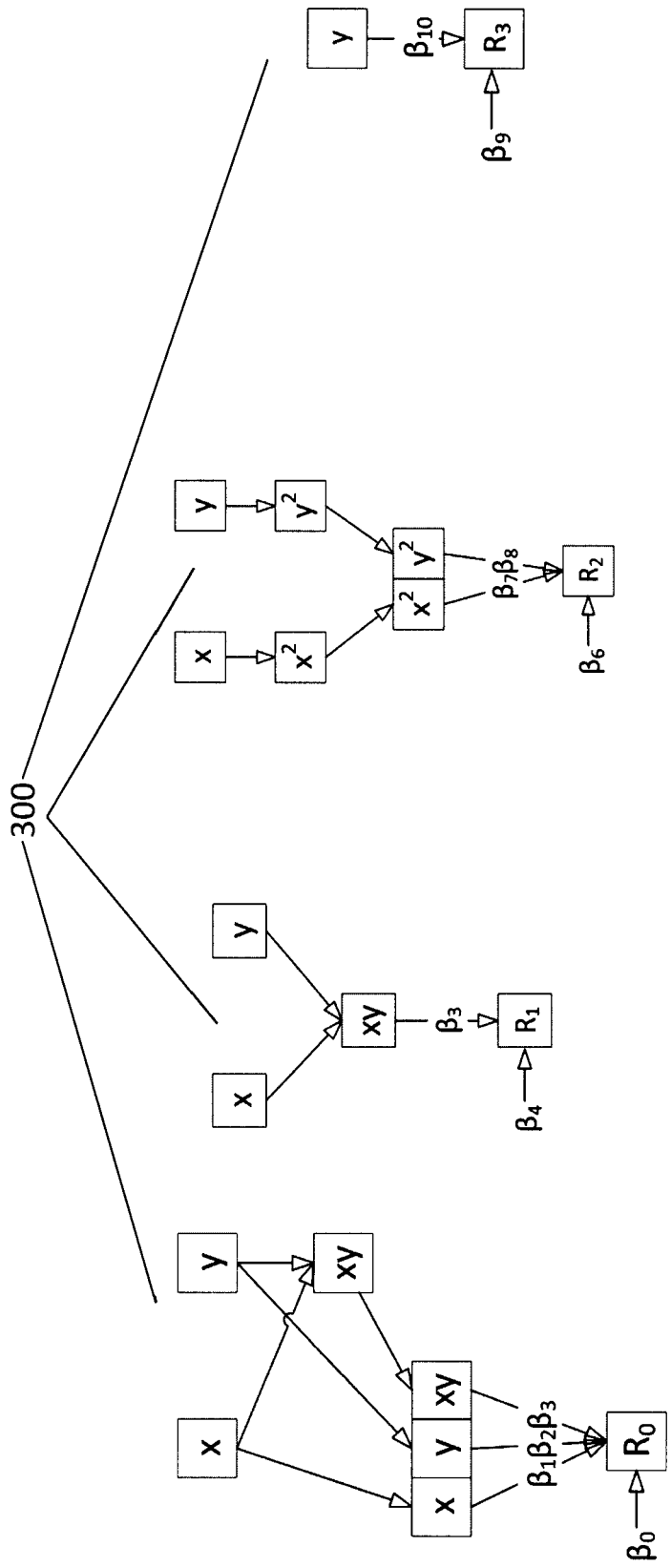
Figure 3 – Micro XNN Prediction Networks.

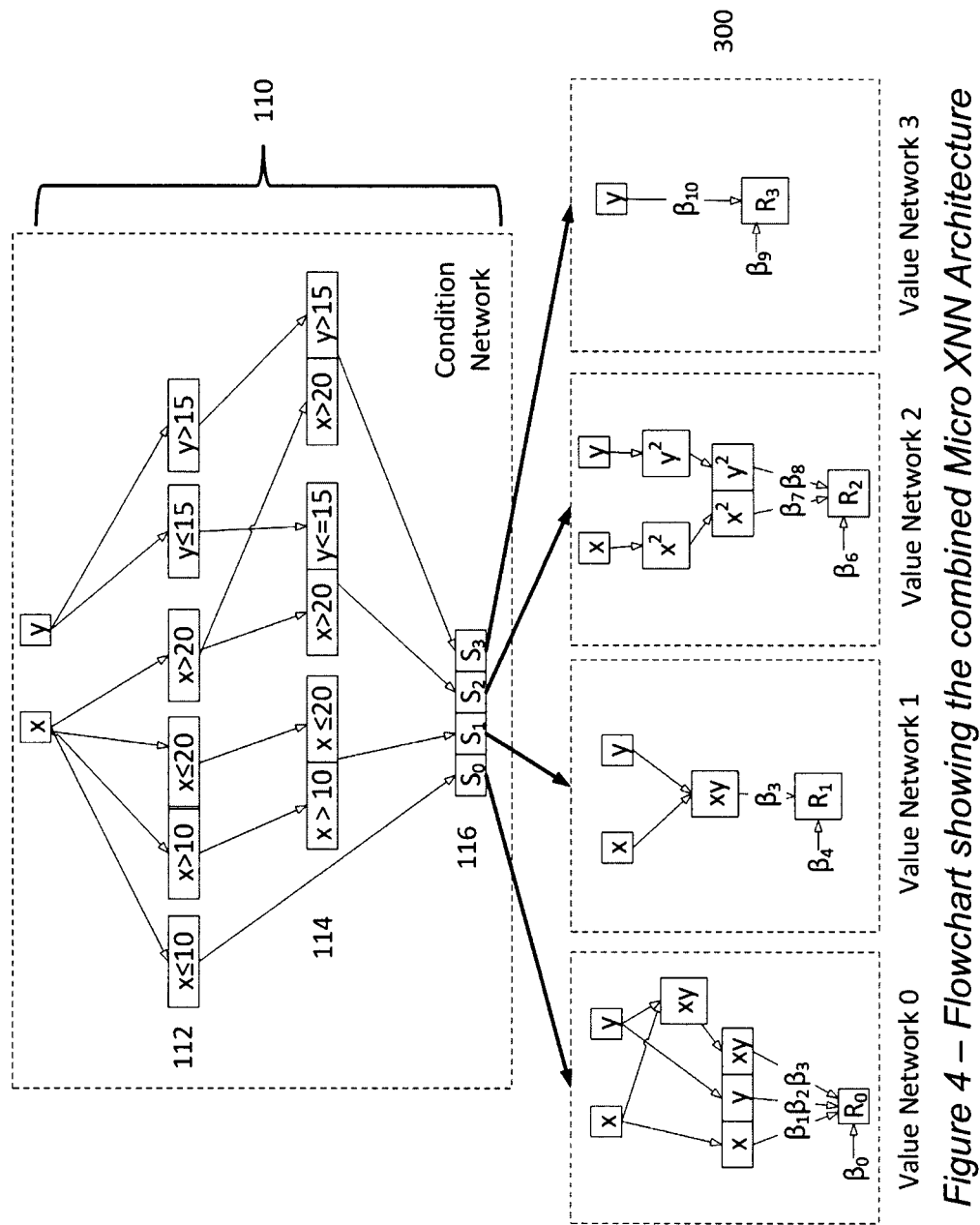
Figure 4 – Flowchart showing the combined Micro XNN Architecture

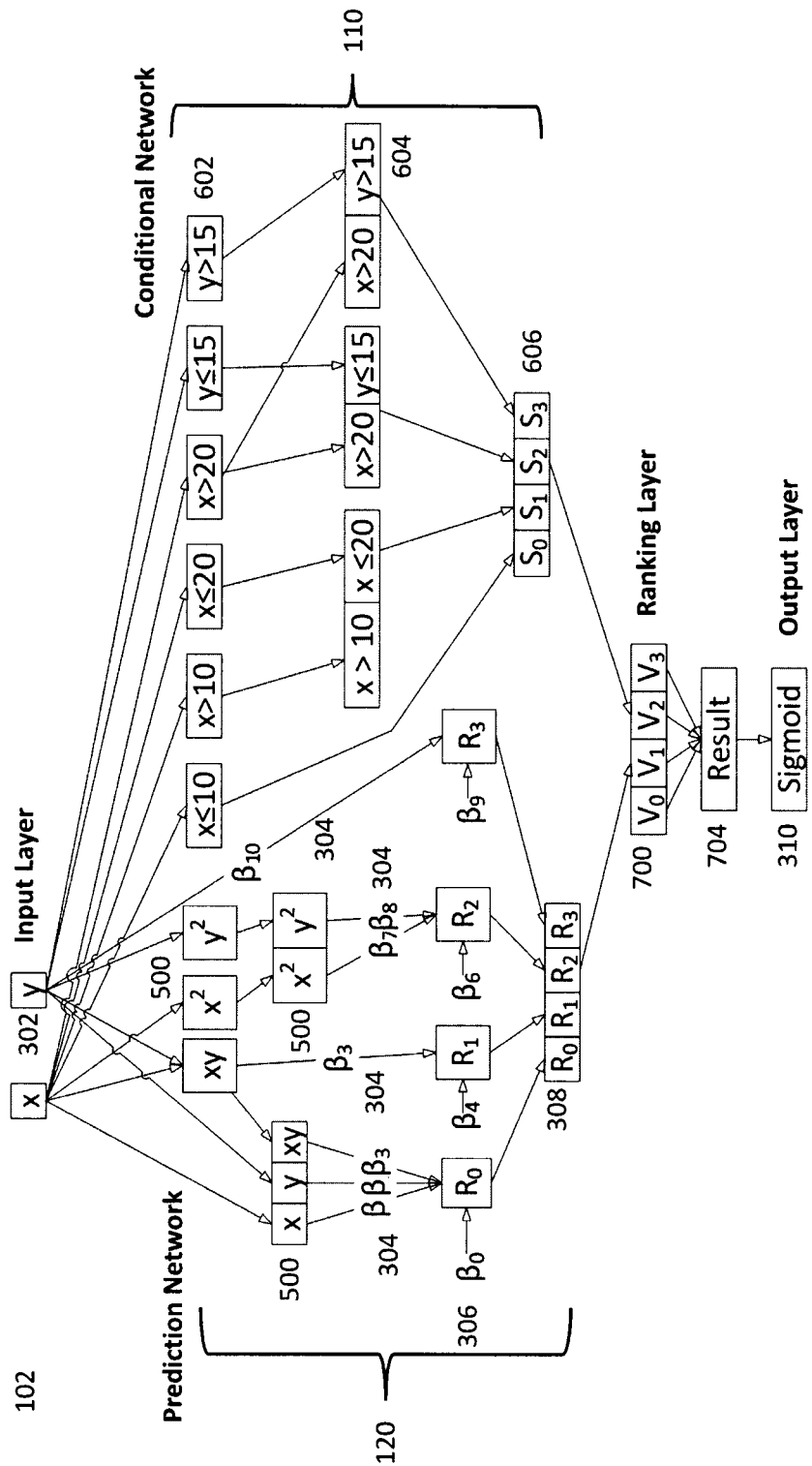
Figure 5 – Exemplary Sparse XNN Architecture

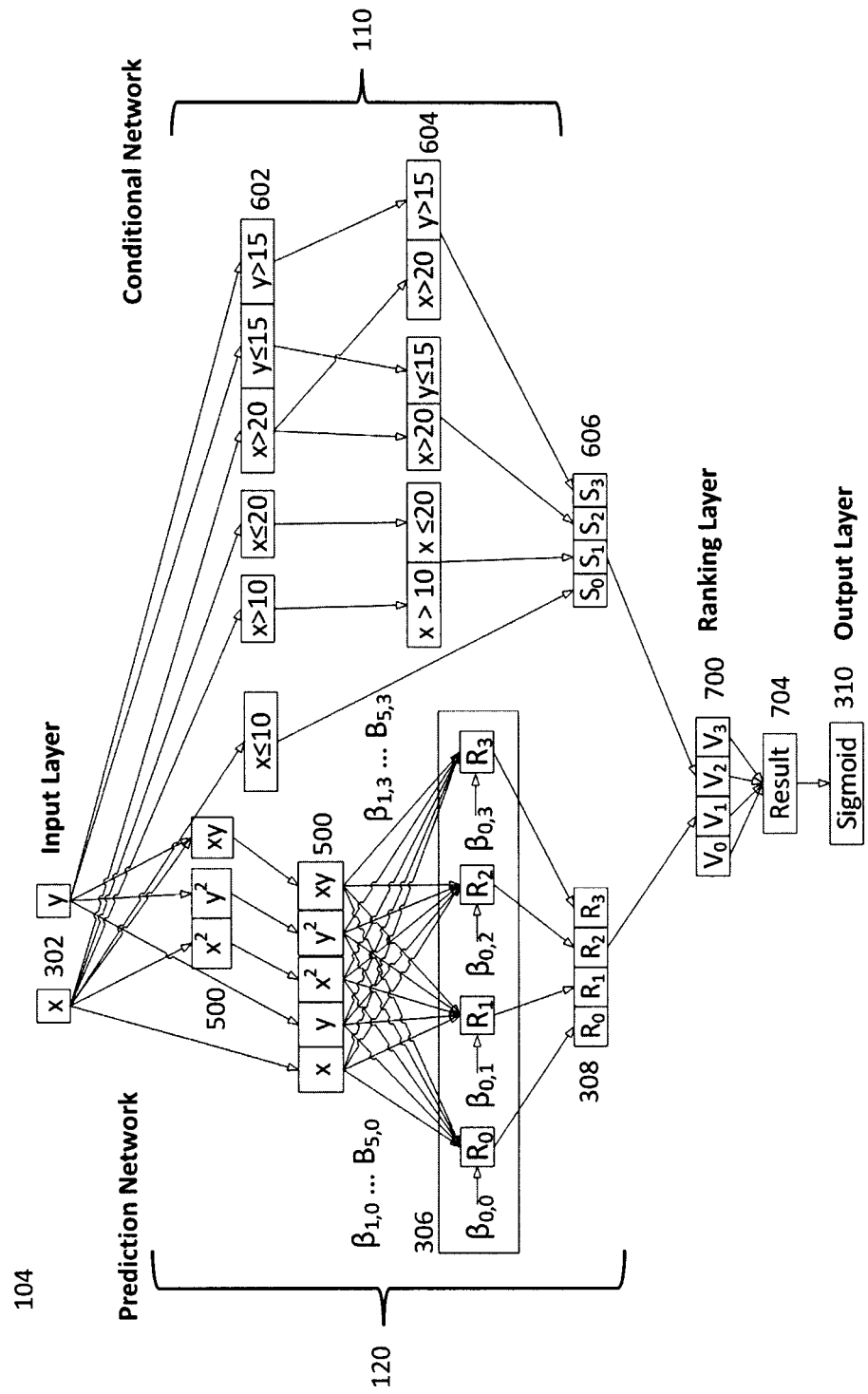
Figure 6 – Exemplary Dense XNN Architecture

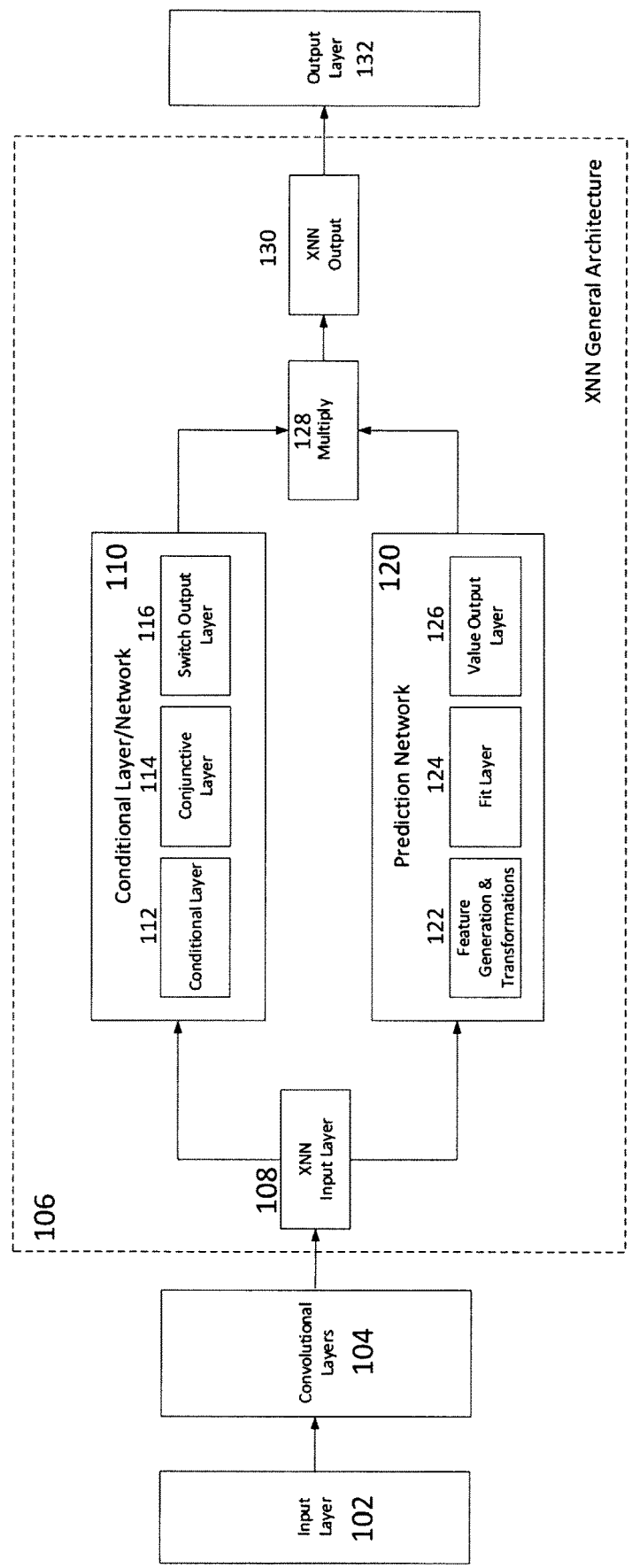
Figure 7 – High-Level CNN-XNN Architecture

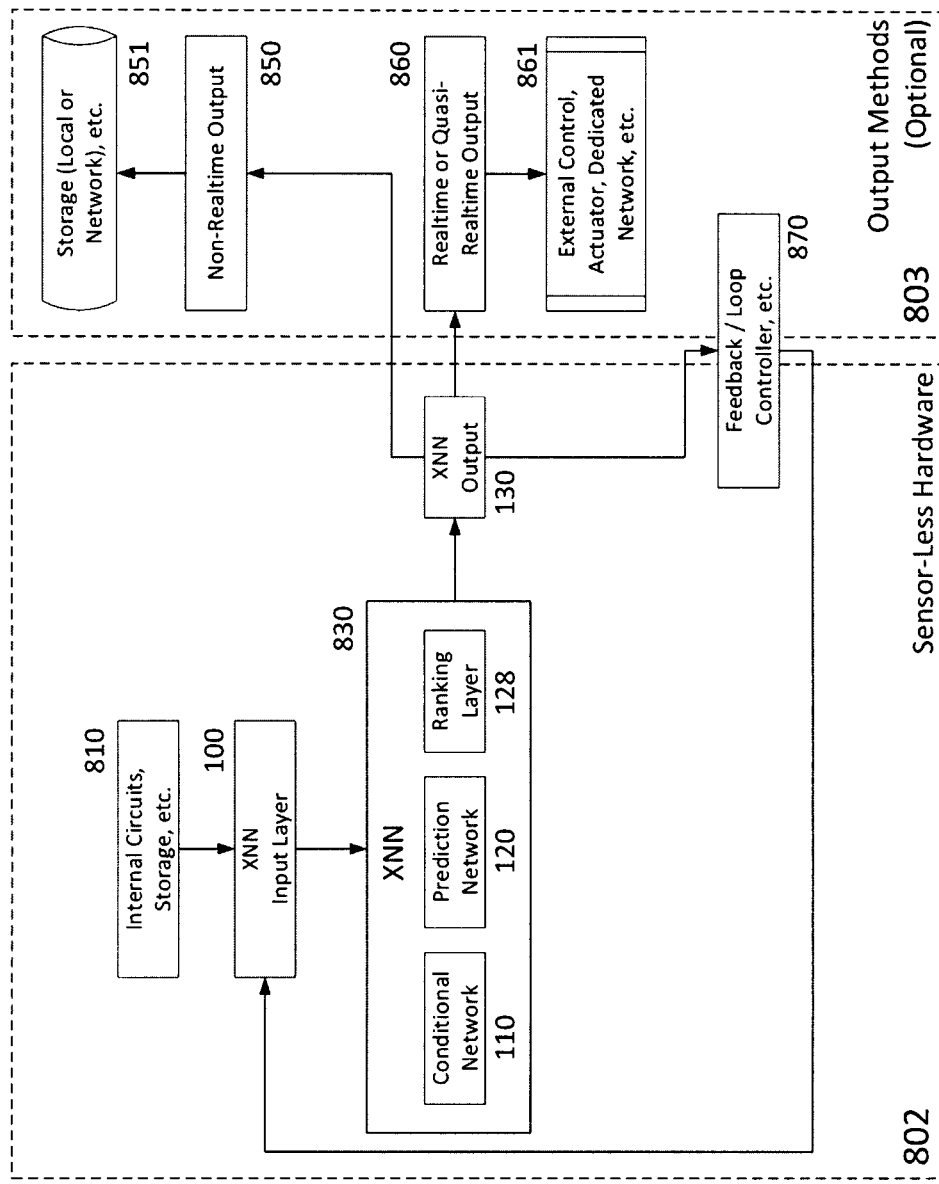
Figure 8 – Exemplary Embodiment using Sensor-less Hardware with Various Output Options

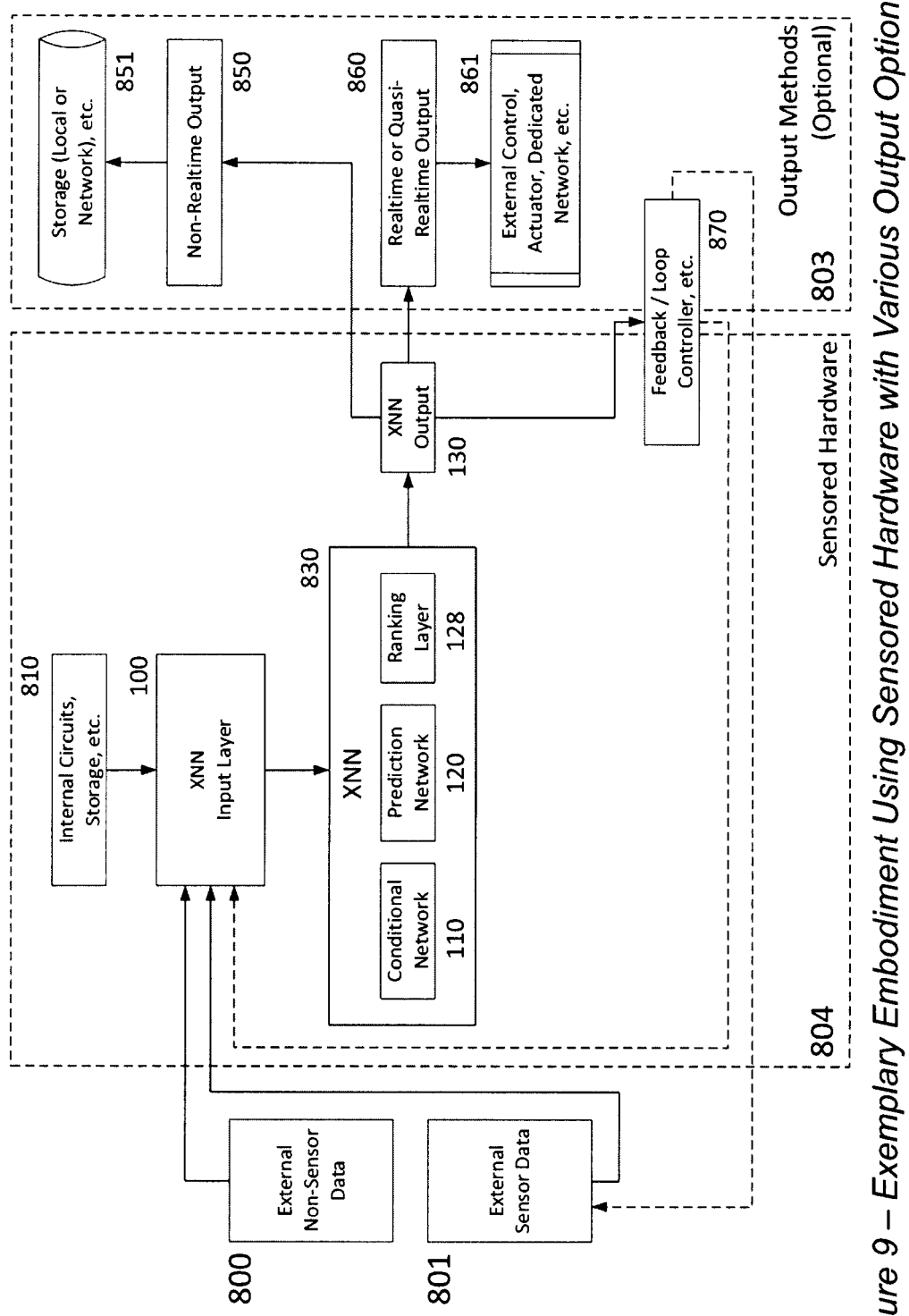
Figure 9 – Exemplary Embodiment Using Sensored Hardware with Various Output Options

ARCHITECTURE FOR A HARDWARE BASED EXPLAINABLE NEURAL NETWORK

FIELD

An exemplary embodiment presents a hardware implementation of an explainable neural network or artificial intelligence.

BACKGROUND

Neural networks have proven to be great at complex tasks, especially where a complicated relationship between a set of inputs and outputs needs to be found automatically. A resurgence of useful AI algorithms that are outperforming humans has been fueled by the application of backpropagation-based methods such as Deep Learning. Despite their success, neural networks lack transparency due to their inherent black-box architecture, leading to lack of trust, hidden biases, and over-dependency on training data.

Neural network architectures have been implemented to solve various problems with better model performance, but very limited research has been done on architectures which are interpretable and explainable, eliminating the need to apply post-hoc methods for interpretability. Lack of explainability can restrict the adoption of new AI applications in decision-critical applications such as autonomous driving and the medical industry.

The lack of understanding within neural networks has limited some of its potential uses. It may be difficult for an analyst or an engineer to explain the relationships between the input and corresponding output of a black-box neural network. Since a neural network could have multiple layers and neurons, it may be impossible to identify which functions occur through the neural network to produce the output.

There is a lot of research on how an Artificial Neural Network (ANN) may be implemented directly and efficiently in hardware, however, there is a need in the field for a hardware implementation which is explainable and interpretable.

SUMMARY

According to at least one exemplary embodiment, a method, system and apparatus for implementing an explainable neural network or artificial intelligence may be shown and described.

Neural networks have proven to be great at complex tasks, especially where a complicated relationship between a set of inputs and outputs needs to be found automatically. Despite their success, neural networks lack transparency due to their inherent black box architecture, leading to lack of trust, hidden biases, and over-dependency on training data. eXplainable Neural Networks (XNNs), create a new type of Artificial Neural Networks (ANNs) that are inherently interpretable and explainable.

XNNs are also designed to be easily implementable both in software but also in hardware efficiently, leading to substantial speed and space improvements. An exemplary embodiment extends upon possible hardware embodiments of XNNs, making them suitable for low power applications, smartphones, mobile computing devices, autonomous navigational devices, server accelerators, Internet of Things (IoT), TinyML and edge computing applications amongst many other applications. An exemplary embodiment may extend upon possible hardware embodiments of XNNs, making them suitable for unpowered applications using externally activated power transmission, such as in RFID, NFC, Qi systems and inductively charged devices amongst other applications.

The capability of XNNs to be transformed from one form to another while preserving their logical equivalence is exploited to create efficient hardware implementations that are optimized for the desired application domain.

Alternative embodiments and implementations as hardware circuits can also be extended to logically equivalent white-box machine learning models that provide similar functionality to eXplainable Neural Nets (XNN), such as eXplainable artificial intelligence (XAI) models, interpretable neural networks (INNs), explainable transducer transformers (XTTs), explainable spiking nets (XSN), explainable memory nets (XMN), and the like, as well as reinforcement learning applications where they may be compatible with explainable reinforcement learning (XRL). The methods described herein may be contemplated to apply to XNNs, XAI models, XTTs, XSNs, XMNs, XRLs interchangeably. Interpretable Neural Networks (INNs) can provide some form of interpretation, and thus form a superset of XNNs and XTTs. The methods described herein may be contemplated to also apply to INNs.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 1 is an exemplary embodiment of a schematic of a general XNN architecture.

FIG. 2 is an exemplary embodiment of a schematic comparing Dense and Sparse XNNs.

FIG. 3 is an exemplary schematic illustrating micro XNN prediction networks.

FIG. 4 shows a combined version of an exemplary micro XNN sub network.

FIG. 5 shows an exemplary embodiment of Sparse XNN architecture.

FIG. 6 shows an exemplary embodiment Dense XNN architecture.

FIG. 7 shows a high-level architecture of a CNN-XNN architecture.

FIG. 8 shows an exemplary embodiment of an XNN implemented using sensor-less hardware with various output options.

FIG. 9 shows an exemplary embodiment of an XNN using sensored hardware with various output options.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

Explainable Neural Networks (XNNs) are a new type of white-box neural network that give rise to new possibilities for a wide variety of AI systems, and are inherently interpretable and explainable. One main concept behind an XNN is that the inner network structure is fully interpretable without sacrificing model performance (i.e., accuracy and feed-forward execution speed). Interpretability is built within the architecture itself, yet it functions like a standard neural network. This eliminates the need to apply additional techniques or processing for interpreting the result of a neural network. XNNs compute both the answer and its explanation and possible justification for the explanation in a single feed-forward step without any need for simulations, iterations, perturbation, etc.

Referring now to exemplary FIG. 1, FIG. 1 may illustrate a schematic diagram of an exemplary high-level XNN architecture. An input layer 100 may be inputted, possibly simultaneously, into both a conditional network 110 and a prediction network 120. The conditional network 110 may include a conditional layer 112, an aggregation layer 114, and a switch output layer (which outputs the conditional values) 116. The prediction network 120 may include a feature generation and transformation 122, a fit layer 124, and a prediction output layer (value output) 126. The layers may be analyzed by the selection and ranking layer 128 that may multiply the switch output by the value output, producing a ranked or scored output 130. The explanations and answers may be concurrently calculated by the XNN by the conditional network and the prediction network. The selection and ranking layer 128 may ensure that the answers and explanations are correctly matched, ranked and scored appropriately before being sent to the output 130.

The processing of the conditional network 110 and the prediction network 120 is contemplated to be in any order. Depending on the specific application of the XNN, it may be contemplated that some of the components of the conditional network 110 like components 112, 114 and 116 may be optional or replaced with a trivial implementation. Depending on the specific application of the XNN, it may further be contemplated that some of the components of the prediction network 120 such as components 122, 124 and 126 may be optional or replaced with a trivial implementation.

It may further be contemplated that in some circumstances, the selection and ranking layer 128 and the output 130 may be combined together into one integrated component. For optimization purposes, the XNN may also be implemented with both the conditional network 110 and the prediction network 120 together with all their components merged together into one network. This merged conditional and prediction network may also be merged together with a combined selection and ranking layer 128 and the output 130. This optimization will still result in a logically equivalent XNN, which may be faster for feed forward processing but may suffer when it comes to training via backward propagation and gradient descent techniques.

The XNN can thus be implemented in a way that there is the input layer 100, and a combination of the conditional network 110 and the prediction network 120, including the conditional layer 112, aggregation layer 114, switch output layer 116, feature generation and transformation layer 122, fit layer 124, prediction layer 126, and ranking layer 128 leading to the output 130. This combination may apply to all embodiments and implementations of the XNN, including both software and hardware implementations. The transformation capabilities of XNNs in this regard are unique and unparalleled in other neural network implementations since the white-box nature of XNNs allows flexibility and extreme merging to be performed without affecting the logical behavior of the XNN, although this affects various attributes of a practical implementation, such as size/space usage, performance, resource usage, trainability, and overall throughput.

The XNN may include a feature generation and transformation layer 122 that contains polynomial transformation neurons as well as a concatenation or fit layer 124, whereby it may combine all polynomial features into one layer.

An exemplary embodiment of a prediction network 120 using a linear model may utilize polynomial equations represented by or mathematically equivalent to the following exemplary polynomial equation:

$$f(x,y)=\beta_0+\beta_1 x+\beta_2 y+\beta_3 x^2+\beta_4 y^2+\beta_5 xy$$

The feature generation and transformation layer 122 may produce a set of variables which are of relevance to the output. The fit layer 124 may produce the set of coefficients which weigh the variables obtained in the feature generation and transformation layer 122. Finally, the coefficients may be analyzed, and a value may be produced in the value output layer 126.

The feature generation and transformation layer 122 is used to implement any advanced transformations that may be applied to the input features and relevant data, such as non-linear transformations. In an exemplary embodiment where a polynomial transformation is being applied, polynomial transformation neurons may be utilized, which may model polynomial equations using a system of specially interconnected weights and neurons that enable a white-box approach to polynomial transformations. The fit layer 124 may be used to implement any model fitting and prediction methods including but not limited to linear and non-linear fitting methods, Fourier series, multi-dimensional Bezier curves, recurrence relations, causal operators, etc. The value output layer 126 combines the value answers together and ensures that they can be combined into a matched pair consisting of an answer together with its corresponding explanation.

Multiple such pairs may be generated if more than one partition has been selected by the XNN focusing step as determined by the conditional network 110. The XNN can be implemented to work completely in parallel, generating plausible answer and explanation pairs which are then filtered and selected at a later stage via the output of the conditional network 110. Both parallel and sequential implementations of the XNN are thus possible, as the implementation can be tweaked to the particular application domain and also to fit within the implementation constraints of the system being utilized to realize the XNN.

High-degree polynomials may successfully be used in order to model complex data, yet may still be uninterpretable, as well as computationally intensive in a high dimensional space. An XNN may instead split the fit of the entire model into multiple smaller fits. This may be done through the concept of "partitions". A partition models a specific region within the entire model. Partitions can be overlapping or non-overlapping, depending on their configuration. In the case of overlapping partitions, some priority function may be used to determine which partition to activate. The process to identify partitions is part of the initialization process of the XNNs. When implemented in hardware, partitions can be implemented either using some form of rewriteable addressable memory or similar type of memory, or hard-coded as a circuit that can increase performance significantly, usually with some form of tradeoff between flexibility and performance, depending on the specific hardware implementation chosen.

When it is possible to fit data using polynomial features, the resulting model may be intuitive. In a standard neural network, modelling non-linearity simply involves adding multiple layers together with activation functions. This may be feasible, but the resulting model may be a black-box and may not be explainable in an intuitive way.

Alternatively, if data can be modeled with something simpler, such as a polynomial fit, polynomial transformations can be embedded within the neural network itself and linear/logistic regression may be added following the transformations. The resulting configuration is considered a white-box. The architecture of XNNs may allow other logically equivalent methods to be incorporated into its design seamlessly, for example using Fourier series transformations and other methods like chain models and stochastic process modelling that may be contemplated as being incorporated into the prediction network 120. It may be further contemplated that the XNN transform function may be a pipeline of transformations including, but not limited to, polynomial expansions, rotations, dimensional and dimensionless scaling, Fourier transforms, Walsh functions, state-space and phase-space transforms, Haar and non-Haar wavelets, generalized L2 functions, fractal-based transforms, Hadamard transforms, Type 1 and Type 2 fuzzy logic, knowledge graph networks, categorical encoding, difference analysis and normalization/standardization of data. It may further contemplated that the transformation function may utilize at least one of a (i) sub-neural network, (ii) gradient descent-based method such as back-propagation, (iii) subsets of an explainable neural network. The transform function pipeline may further contain transforms that analyze sequences of data that are ordered according to the value of one or more variables, including temporally ordered data sequences.

The terms interpretable and explainable may have different meanings. Interpretability may be a characteristic that may need to be defined in terms of an interpreter. The interpreter may be an agent that interprets the system output or artifacts using a combination of (i) its own knowledge and beliefs; (ii) goal-action plans; (iii) context; and (iv) the world environment. An exemplary interpreter may be a knowledgeable human.

An alternative to a knowledgeable human interpreter may be a suitable automated system, such as an expert system in a narrow domain, which may be able to interpret outputs or artifacts for a limited range of applications. For example, a medical expert system, or some logical equivalent such as an end-to-end machine learning system, may be able to output a valid interpretation of medical results in a specific set of medical application domains.

It may be contemplated that non-human interpreters may be created in the future that can partially or fully replace the role of a human interpreter, and/or expand the interpretation capabilities to a wider range of application domains.

There may be two distinct types of interpretability: (i) model interpretability, which measures how interpretable any form of automated or mechanistic model is, together with its sub-components, structure, and behavior; and (ii) output interpretability which measures how interpretable the output from any form of automated or mechanistic model is.

Interpretability thus might not be a simple binary characteristic but can be evaluated on a sliding scale ranging from fully interpretable to un-interpretable. Model interpretability may be the interpretability of the underlying embodiment, implementation, and/or process producing the output, while output interpretability may be the interpretability of the output itself or whatever artifact is being examined.

A machine learning system or suitable alternative embodiment may include a number of model components. Model components may be model interpretable if their internal behavior and functioning can be fully understood and correctly predicted, for a subset of possible inputs, by the interpreter. In an embodiment, the behavior and functioning of a model component can be implemented and represented in various ways, such as a state-transition chart, a process flowchart or process description, a Behavioral Model, or some other suitable method. Model components may be output interpretable if their output can be understood and correctly interpreted, for a subset of possible inputs, by the interpreter.

An exemplary machine learning system or suitable alternative embodiment may be (i) globally interpretable if it is fully model interpretable (i.e., all of its components are model interpretable), or (ii) modular interpretable if it is partially model interpretable (i.e., only some of its components are model interpretable). Furthermore, a machine learning system or suitable alternative embodiment, may be locally interpretable if all its output is output interpretable.

A grey-box, which is a hybrid mix of a black-box with white-box characteristics, may have the characteristics of a white-box when it comes to the output, but those of a black-box when it comes to its internal behavior or functioning.

A white-box may be a fully model interpretable and output interpretable system which can achieve both local and global explainability. Thus, a fully white-box system may be completely explainable and fully interpretable in terms of both internal function and output.

A black-box may be output interpretable but not model interpretable, and may achieve limited local explainability, making it the least explainable with little to no explainability capabilities and minimal understanding in terms of internal function. A deep learning neural network may be an output interpretable yet model un-interpretable system.

A grey-box may be a partially model interpretable and output interpretable system and may be partially explainable in terms of internal function and interpretable in terms of output. Thus, an exemplary grey-box may be between a white-box and a black-box on a scale of most explainable and interpretable (white-box) to least explainable and interpretable (black-box). Grey-box systems may have a level of modular interpretability since some of their components may be model interpretable.

Some neural network architectures may output interpretable results, but these results might not be fully model interpretable. Hence, these neural network architectures are considered black-box, or grey-box if some inner components are considered model interpretable. XNNs offer advantages over these neural network architectures, for example, by providing an output interpretable and fully model interpretable system (white-box). Unlike black-box neural networks, XNNs uniquely use partitions to structure a model into well-defined and interpretable local models. Additionally, since black-box architectures are only output interpretable, it may not be possible to encode the network into machine and human readable rules. Therefore, black-box models may only be capable of providing local explanations, and may not be capable of providing global interpretability directly from the model structure. Other types of neural network architectures may have similar drawbacks. Since none of these other types of neural network architectures may incorporate the concept of partitioning, the functions that model the different components in these alternative structures may often require a complex non-linear transformation, which may turn out to be entirely a black-box component; this restricts these alternative architectures to being output interpretable and not model interpretable. For full model interpretability understanding of the model, it may be noted that the transformations within the different components should also be interpretable, which may be provided by exemplary embodiments of XNN structures. XNNs may adopt a wide-network approach through the different partitions, thus enabling transformations to be simpler and easier to understand, rather than complex and impossibly opaque as with deep networks. It may further be contemplated that XNNs may also support inner components which make use of a deep network structure, thus in combination may be superior to any existing neural network architectures.

While present technologies may use some form of a linear equation to model an explainable function using a neural network, XNNs differ in several aspects: First, XNNs use the notion of hierarchical features (or hierarchical concepts) through the notion of partitions and rules. In XNNs, the function f(x) can be seen as a local function, which models the feature importance within a specific partition. The combination of all the functions creates a global interpretable model. Further, XNNs may utilize an external process to identify suitable partitions during their initialization, yet also support further training using back-propagation and related technique. Current technology relies solely on using back-propagation to learn a function which may limit the level of explainability.

Since XNNs may be encoded into rules and may make use of an external process to initialize the structure of the XNN partitions, it is possible to embed human-knowledge within the neural network. Thus, XNNs can mix human knowledge and machine-generated knowledge. Through the use of gradient descent methods such as back-propagation, knowledge in the form of rules could be refined to create a global model which can also function in a local manner. The current technology is not capable of functioning as such, as a typical neural network is simply used to fit a single large function.

The weights and structure of an XNN can be encoded in a sequence of IF-THEN rules or disjunctive normal form (DNF) rules or Conjunctive normal form (CNF) rules. In an embodiment, the resulting model may be a single equation which incorporates all the features (or concepts).

XNNs support rotational and scale invariance together with non-linear functions, and also summarization over multiple partitions in multiple dimensions. The current technology uses a combination of linear functions and cannot represent non-linear data in the same manner that XNNs with a high-level of interpretability can.

XNNs provide a higher level of flexibility by enabling partitions to be customized according to the level of simplicity or complexity which is required. In the prior art, if the resulting model is interpretable, but still too complex to understand, it may not be possible to create new partitions in order to simplify the local interpretability, while still maintaining the global interpretability.

An XNN, being a true white-box system, does not suffer from any reconstruction losses or any classification losses. A reconstruction step may not be needed by the XNN and a precise classification may be created as part of the explanation by the XNN in a lossless manner. All information needed to come up with the classification is preserved by the XNN, and additionally all the activation paths and methods used are also easily identifiable without any additional computational cost.

Hierarchical clustering techniques or other logically equivalent methods can be used for identifying suitable partitions, such as an XAI model induction method which may input a set of training data to a black-box system, and analyze the corresponding output using a partitioning function.

In an exemplary embodiment that may use a hierarchical clustering method for partitioning, a variety of appropriate methods may be used for a practical implementation including, but not limited to, agglomerative clustering, divisive clustering, relocation partitioning, probabilistic clustering, k-medoid methods, k-means methods, fuzzy clustering, density based clustering, grid based methods, gradient descent based methods, evolutionary methods, region splitting, region growing, sub-space clustering, projection methods, co-clustering methods and lazy clustering methods.

The input to the partitioning method can be either the input features directly for low-dimensional data (i.e., tabular) or data which has been pre-processed (for example, from a convolutional network). Features which have been transformed using a convolutional process may typically represent a higher-level of abstraction such as an edge, a stroke, or a pattern.

The partitions may be initially created as part of the XNN by an external process that creates the initial XNN, such as the previously described model induction method. However, once created, the XNN can use gradient descent methods to further refine the partitions if desired. The XNN partitions may either be locked by having their values set as static values that cannot be changed or can be movable dynamically for each backward training pass using standard back-propagation and related techniques.

Hierarchical clusters may always be converted into logically equivalent flat clusters prior to hardware deployment. Additionally, the hierarchical structure can be either precalculated and converted to an appropriate hardware implementation, or in the case of more advanced hardware such as FPGAs, can also be implemented locally onboard. Each part of the hierarchy can be implemented either as part of the same hardware circuit or as a set of components that can correspond to a sub-set of the hierarchy. In this manner, a high degree of parallelism can be achieved natively in hardware, especially in high performance applications.

Additionally, the white-box nature of XNNs allows for additional ways of changing the partitions and values using techniques such as Genetic Algorithms and Monte Carlo Simulation Methods, or via Casual Logic and Simulation techniques. These additional ways are not normally available for standard neural network implementations due to their black-box nature, giving a distinct advantage to XNNs. The XNN partitions may be hierarchical rather than just a flat partition. (However, flat partitions may be encompassed by the definition of a hierarchical structure. As such, flat partitions may be supported as a sub-set of hierarchical partitions where there is just a single level.) The utilization of a hierarchy allows for more expressive explanations to be generated that more adequately models the expected nature of a good explanation.

The white-box nature of XNNs gives distinct advantages when implemented in hardware in comparison to a typical black-box ANN, Deep Learning network, and similar types of models. As each part of the XNN is understood and interpretable, logical equivalence between different circuit types can be established in a proven manner, transforming, and optimizing the circuit, for example, for space efficiency or for overall throughput speed. These kinds of transformations cannot be achieved using a black-box model. Additionally, white-box XNNs allow for action triggers to be implemented in hardware, allowing for fast real-time signaling to occur without needing to pause or stop the network in any manner. Triggers may be defined on particular conditions occurring within the network and may be either configurable or hardcoded in a circuit. Upon triggering, a signal is raised which then activates some other part of the circuit to perform an action, hence the name action triggers. In an exemplary sensored hardware implementation, signals can be used to communicate with sensors or some form of interface device. Signals can also be used to provide either re-entrant or non-re-entrant functionality in hardware and can also provide a way for communicating with a parent system and/or embedded system efficiently. Using action triggers, distributed systems of XNNs can be implemented in hardware, either using an implementation that supports some form of multi-threading or parallelism, or directly using custom circuits. The XNN's white-box nature can allow for such circuits to be optimized, both in their function and also in the physical layout of the resulting circuit. In an exemplary embodiment, a hardware XNN chip may be embedded within a larger system, such as a driverless vehicle, and fast low-power processing can be performed using the dedicated hardware and any anomalies, discrepancies, features, and/or other signals are sent back to the vehicle for real-time evaluation and action together with an explanation.

In an exemplary INN implementation in hardware, since INNs may be partially composed of a black-box model fused together with a white-box model, the white-box advantages for hardware implementation may largely apply to the white-box part of the INN. All the hardware white-box optimization techniques available for XNNs are available for the white-box part of the INN, while the black-box part of the INN may be implemented in hardware in a similar manner to standard ANNs.

It may be contemplated that, depending on the results of the induction method used to create the XNN, an XNN may be a type of white-box Wide Neural Network (WNN). WNNs complement the mainstream black-box Deep Neural Networks (DNNs) and provide significant advantages over DNNs. Independent analysis of WNNs in (Zagoruyko and Komadikis, 2017) shows that WNNs may significantly outperform logically equivalent yet much more structurally complex DNNs by magnitudes of order, and also WNNs may be several times faster to train than DNNs. XNNs may provide both these two additional advantages, and initial experimental results from XNN implementations strongly indicate that these advantages are applicable to XNNs and that hardware implementations of XNNs may take advantage of these advantages to utilize less resources to achieve the same effect.

XNNs can be fully implemented and realized directly in hardware as digital electronic circuitry, analog circuitry, or digital-analog hybrids, integrated circuitry, specially designed application specific integrated circuits (ASICs), field programmable gate arrays (FPGAs) computer hardware, neuromorphic circuits, quantum computing hardware, firmware and/or combinations thereof.

These various aspects or features can include implementation that are executable and/or interpretable on a hardware system that typically includes at least one programmable processor, which can be special or general purpose, coupled to receive data and instructions from, and to transmit data and instructions to typically at least one storage system, at least one input device, and at least one output device. Other alternative embodiments may exist in which the need for a processor is eliminated by having the XNN directly implemented as a hardware circuit, eliminating the need for storage by having hard-coded values (at the expense of flexibility in training but without loss of typical operational function), eliminating the need for input when dealing with sensorless systems, and eliminating the need for output devices when dealing with storage based implementations that do not produce output directly.

The hardware system may include clients and servers. A client and server may be remote from each other and may interact through a communication network. The client and server can be either other hardware systems, or a combination of software and hardware systems. Some types of XNNs, such as Distributed XNNs, are optimized for such a client-server architecture or a more flexible distributed architecture including serverless systems and fully or partially decentralized systems.

Any software that may be needed for the hardware system to function, such as with hardware systems that contain programmable processors, will need some form, programmatic representation, or machine instruction for such programmable processors that implement the XNN. This software can be implemented in a high-level procedural language, an object-oriented programming language, a functional programming language, a logical programming language, and/or in assembly/machine language.

The hardware system implementation of the XNNs may utilize a machine-readable medium, such as a software product, apparatus and/or other device, used to provide machine instructions and/or data to a programmable processor, non-programmable processor, or some kind of encoding mechanism, including a machine-readable medium that receives machine instructions as a machine-readable signal.

Machine-readable signals may be any signal used to provide machine instructions and/or data to a hardware system and may be transmitted or relayed over some kind of network or other transmission system. The machine-readable medium can store such machine instructions non-transitorily, such as for example using a hard drive, or solid-state memory, or any equivalent storage medium. The machine-readable medium can alternatively or additionally store such machine instructions in a transient manner, such as for example using a cache memory, a random-access memory associated with one or more physical processor cores, a time synchronized pulse, an encoded waveform, or any equivalent transient storage medium.

XNNs can also be extended and enriched with the addition of items such as taxonomical information, links to internal and external taxonomies, bias detectors, and also seamlessly integrated with knowledge bases and rule systems, all of which is impossible to do with existing approaches that are all black-box methods. XNNs can also form part of a causal logic induction system that can extract higher level concepts and link them to a causal model, which is something that is completely impossible to do with a standard black-box neural network. XNNs can link causal effects not just at the output layer but also within their internal layers, giving unique capabilities to the XNN architecture that allow AI systems using XNNs to achieve knowledge, understanding, and advanced reasoning capabilities outside the reach of deep learning-based systems and machine learning techniques that do not fully support the entire range of first-order logic rules and assertions.

XNN output may be provided as an explanation in the form of a Universal Explanation Format that is both human and machine readable along with any additional information that is specific to the application being implemented. According to at least one exemplary embodiment, a method for encoding and transmitting knowledge, data, and rules, such as for an explainable AI (XAI) system, may be shown and described. The data may be in machine and human-readable format suitable for transmission and processing by online and offline computing devices, edge and internet of things (IoT) devices, and over telecom networks. The method may result in a multitude of rules and assertions that may have a localization trigger. The answer and explanation may be processed and produced simultaneously. Explanations may encompass both direct model explanations regarding the answer and an explanation/justification of how the explanation itself was created. The rules may be applied to domain specific applications, for example by transmitting and encoding the rules, knowledge, and data for use in a medical diagnosis imaging scanner system so that it can produce a diagnosis along with an image and explanation of such. The resulting diagnosis can then be further used by other AI systems in an automated pipeline, while retaining human readability and interpretability.

The representation format may be a system of disjunctive normal form (DNF) rules or other logical alternatives, like conjunctive normal form (CNF) rules, first-order logic assertions, and the like. The representation format can also be implemented directly as a hardware circuit, which may be implemented either using (i.) flexible architectures like FPGAs, or (ii.) more static architectures like ASICs or analog/digital electronics, or (iii.) neuromorphic architectures that are suited for the hardware implementation of connectionist models such as XNNs, or (iv.) quantum computing hardware. The representation transmission can be affected entirely in hardware when using flexible architectures that can configure themselves dynamically. Quantization and other compression techniques may be applied on the XNN for faster and more efficient execution.

The localized trigger may be defined by a localization method, which determines which partition to activate. A partition is a region in the data, which may be disjointing or overlapping. Different partitions may be implemented on separate components or may be implemented in the same component. It may be contemplated that if a partition is implemented on a separate component, the system need only to activate that unit, and the other components containing other partitions may not need to be activated or powered. A rule may be a linear or non-linear equation which consists of coefficients with their respective dimension, and the result may represent both the answer to the problem and the explanation coefficients which may be used to generate domain specific explanations that are both machine and human readable. An exemplary embodiment applies an element of human readability to the encoded knowledge, data and rules which are otherwise too complex for an ordinary person to reproduce or comprehend without any automated process.

Explanations may be personalized in such a way that they control the level of detail and personalization presented to the user. The explanation may also be further customized by having a user model that is already known to the system and may depend on a combination of the level of expertise of the user, familiarity with the model domain, the current goals, plans and actions, current session, user and world model, and other relevant information that may be utilized in the personalization of the explanation. The explanation may be presented in a variety of forms. For example, a human understandable explanation may be audibly presented using speakers. In another exemplary embodiment, the explanation may be presented visually by displaying the explanation on a user's screen or device. The display may be of any form, such as human understandable text, machine-readable text, a heatmap, a picture, or any other contemplated form.

Various methods may be implemented for identifying the rules, such as using an XAI model induction method, an explainable neural network (XNN), an explainable transducer transformer (XTT), or any other logically equivalent methods that may exist or are yet to be invented.

User interaction may be provided using various devices including but not limited to display devices, sensory feedback devices such visual, auditory, or tactile feedback, haptic devices and any other output devices that are appropriate to the application domain. User input may be received in any form including, but not limited to acoustic, speech, or tactile input, touch-sensitive devices, voice recognition devices, optical scanners, imaging devices, multi-dimensional scanners, LIDAR/RADAR, time of flight measurement devices and other devices that may provide input to the hardware implementation.

XNNs ensure that the best practices in explanation encoding, transmission and eventual conversion to a human-readable or machine-readable higher-level domain specific explanation are fully supported. Multiple hierarchical partition techniques exist that may be utilized for XNN initialization including hierarchical partitioning, lazy clustering, agglomerative clustering, divisive clustering, relocation partitioning, probabilistic clustering, k-medoid methods, k-means methods, fuzzy clustering, density based clustering, grid based methods, gradient descent based methods, evolutionary methods, region splitting, region growing, subspace clustering, projection methods, co-clustering methods, lazy clustering methods, etc. In certain exemplary embodiments, the number of partitions may be generally dependent on the overall complexity of the original predictor model or the underlying dataset, such that the more complex the model, the more partitions may be created. Multiple partitions may be connected with a "switch". The switch may determine which partitions to activate through the binary values. The resulting switch is then multiplied with the linear output.

XNNs may be designed to work with different non-linear transformations, including but not limited to polynomial expansion, Fourier transforms, continuous data bucketization, causal operators, and so on. Conditional features may also be applied. XNNs can also apply intelligent merging and summarization of partitions at multiple levels of detail, while also catering to some scale and rotational invariances whenever possible. Adjacent partitions in multi-dimensional space that have a possible fit in multi-dimensional space which summarize one or more partitions more efficiently will get an associated summary that may be more amenable to explanation generation.

Scale invariance may be accounted for by appropriate coefficients which adjust the scale in multiple dimensions. Rotational invariance may be accounted for by having appropriate rotational coefficients that adjust rotation in multiple dimensions. This is a powerful feature of XNNs that enables non-linear data to be explained in a superior manner than methods that simply use linear methods exclusively. For example, if multiple partitions representing a rotated elliptical boundary exist in the XNN model, these partitions can be merged into a single representation of a rotated ellipse, giving a precise yet highly summarized representation of potentially complex boundaries that may be voluminous to describe using linear fitting. The resulting summary explanation is also more accurate than could be achieved using linear fitting and also follows the widely accepted principle that a shorter explanation is preferred over a longer explanation whenever available.

An exemplary embodiment may be embodied in various systems, apparatus, methods, and/or objects depending on the desired configuration. The implementations described herein do not represent all possible implementations and are merely examples consistent with aspects related to the embodiments. Although a few variations are described in detail above, other modifications or additions are possible. In particular, further features and/or variations can be provided in addition to those described, for example, the implementations can be directed to various combinations and sub-combinations of the disclosed features and/or combinations and sub-combinations of several further features.

Referring to FIG. 1, FIG. 1 may illustrate a schematic diagram of an exemplary high-level XNN architecture. An input layer 100 may pass an input, possibly simultaneously, into both a conditional network 110 and a prediction network 120. The conditional network 110 may include a conditional layer 112, an aggregation layer 114, and a switch output layer (which outputs the conditional values) 116. The prediction network 120 may include a feature generation and transformation 122, a fit layer 124, and a prediction/value output layer 126. The layers may be analyzed by the selection and ranking layer 128 that may multiply the switch output by the value output, producing a ranked or scored output 130. The explanations and answers may be concurrently calculated by the XNN by the conditional network and the prediction network. The selection and ranking layer 128 may ensure that the answers and explanations are correctly matched, ranked and scored appropriately before being sent to the output 130.

The processing of the conditional network 110 and the prediction network 120 is contemplated to be in any order. Depending on the specific application of the XNN, it may be contemplated that some of the components of the conditional network 110 like components 112, 114 and 116 may be optional or replaced with a trivial implementation. Depending on the specific application of the XNN, it may further be contemplated that some of the components of the prediction network 120 such as components 122, 124 and 126 may be optional or replaced with a trivial implementation.

It may further be contemplated that in some circumstances, the selection and ranking layer 128 and the output 130 may be combined together into one integrated component. For optimization purposes, the XNN may also be implemented with both the conditional network 110 and the prediction network 120 together with all their components merged together into one network. This merged conditional and prediction network may also be merged together with a combined selection and ranking layer 128 and the output 130. This optimization will still result in a logically equivalent XNN, which may be faster for feed forward processing but may suffer when it comes to training via backward propagation and gradient descent techniques.

The XNN can thus be implemented in a way that there is the input layer 100, and a combination of the conditional network 110 and the prediction network 120, including the conditional layer 112, aggregation layer 114, switch output layer 116, feature generation and transformation layer 122, fit layer 124, prediction layer 126, and ranking layer 128 leading to the output 130. This combination may apply to all embodiments and implementations of the XNN, including both hardware and software implementations. The transformation capabilities of XNNs in this regard are unique and unparalleled in other neural network implementations since the white-box nature of XNNs allows flexibility and extreme merging to be performed without affecting the logical behavior of the XNN, although this affects various attributes of a practical implementation, such as size/space usage, performance, resource usage, trainability, and overall throughput.

The interpretability of an XNN circuit in hardware allows for more intelligent circuit design and hardware design to be performed than with a black-box model. Black-box models may waste a significant amount of hardware resources and circuitry. Since sub-parts of a black box model's circuitry are not interpretable, no optimization can be carried out in general. Thus, the hardware circuitry can be optimized for an XNN in a way that is impossible to achieve with a black-box ANN. For example, in an exemplary XNN circuit which has repeated or redundant parts, those parts can be implemented as a single circuit which is then re-used along multiple execution paths. Since the precise function of the circuit is known and understood in an XNN, such logical circuit merging and optimization decisions can be made safely with the knowledge that the overall behavior of the implemented XNN will be identical to the unoptimized original XNN. This kind of optimization is not available in general to a black-box ANN, which will need to be implemented as whole, even if a significant percentage of hardware resources, circuitry and power are wasted due to redundancies in the black-box.

Another major benefit of XNNs and INNs embodied in a hardware environment, is that explanations may be used to trigger intelligent actions which would be impossible to achieve with black-box methods. This kind of behavior is useful in applications of autonomous AI, whereby full explainability may be required for every action, result, and failure occurring in the system. Black-box neural networks deployed on edge hardware may require additional post-hoc techniques for generating an explanation. Such methods may utilize perturbation methods and/or offline analysis of some form. Thus, black-box methods may be completely unsuitable for real-time applications. As opposed to black-box implementations, hardware XNNs/INNs are advantageously capable of generating a prediction and an explanation in a single feed-forward pass, without the need to rely on software or external interactions, but rather an end-to-end hardware deployment.

An exemplary embodiment may implement an XNN in hardware. Implementations of the current subject matter can include, but are not limited to, methods consistent with the descriptions provided herein as well as articles that comprise a tangibly embodied machine-readable medium operable to cause one or more machines (e.g., computers, FPGAs, hardware chips, etc.) to result in operations implementing one or more of the described features. Similarly, hardware systems are also described that may include one or more processors and one or more memories coupled to the one or more processors. Similarly, hardware systems are also described that have a directly implemented XNN in the circuitry thus needing no processor and optionally memory for the storage of weights.

If the XNN implementation does not need to be trainable, a static (hard-coded) implementation of the weights in hardware is also possible, removing the need for a processor and/or a memory in the conventional sense. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

Apart from a conventional implementation of XNNs on general purpose computing hardware, hardware only or predominantly hardware XNNs may be embodied using various hardware implementation methods including but not limited to: flexible compute architectures such as FPGAs; ASICs; analog electronics; analog-digital electronics; conventional discrete electronic components, transistors, etc.; spintronics; and neuromorphic chips.

Other possible hardware implementations and embodiments of XNNs may be contemplated, including currently available hardware such as surface mounted chip architectures, optical computing architectures, optical-electric hybrid architectures, memristors and quantum computing components. The principles outlined here fully apply in the implementation of hardware XNNs on such architectures.

An exemplary embodiment may implement a hybrid solution involving a mix of technologies with conventional general processing hardware such as standard CPUs, graphical processing units (GPU), and tensor processing units (TPU). It may be contemplated that the choice of specific hardware implementation may be guided by the specific application where the hardware XNNs will be deployed.

Certain parts of XNNs, such as the switch network, may be designed to be efficiently implemented directly in hardware and may thus achieve a significantly high speed and performance improvement as a result. An exemplary embodiment may take advantage of different numeric precision representations when implemented in hardware as the coefficients and explanations in general may be implemented without a loss in precision. Further, an exemplary embodiment may achieve substantial power and cost savings when implemented in hardware, without adversely affecting performance.

XNNs are designed to be robust with respect to quantization errors that may be introduced in hardware implementations, either due to the limitations of the processing capabilities of the hardware itself (for example, when having a lower number of bits available than the original logical XNN equivalent, forcing precision losses to take place), due to low-fidelity errors that may be introduced in Analog-to-Digital conversion and/or sampling of sensory or other input, due to floating-point implementations, or any other sources that reduce high-fidelity representations of the various XNN weights to a lower-fidelity representation in hardware. The separation of the conditional network 110 and the prediction network 120 as shown in the exemplary embodiments illustrated in FIGS. 1, 4, 5, and 6 may significantly reduce the overall error introduced due to quantization and other related precision losses. In an exemplary embodiment, quantization may be applied on the conditional network 110 separately from the quantization in the prediction network 120.

For some applications, such as classification, the precision of the results may not be affected at all, allowing for a much faster and/or much cheaper implementation in hardware using lower specification floating-point representations, for example using 16-bit, 8-bit or even 4-bit floating-point representations. The white-box nature of XNNs uniquely allow quantization methods to be applied in tandem with re-weighting methods that utilize the information about each component within the XNN. Exemplary quantization methods may approximate the model or neural network and may reduce the memory requirement and computational cost of using the model or network. Experimental data from early Quantized XNN implementations have indicated superior speedups with minimal accuracy loss while still preserving explainability.

Flexible computing architectures such as FPGAs allow hardware to be specially reconfigured in real-time or using a special programming process, giving similar advantages to having a software implementation on general computing architecture with all the performance and power benefits of a custom hardware circuit.

Flexible computing architectures, or reconfigurable computing, may be used to implement XNNs and all XNN variants in a relatively straightforward manner. The XNN can be initially created using a suitable hardware description language, such as VHDL (the Very High-Speed Integrated Circuits Program (VHSIC) Hardware Description Language (HDL), together VHDL) or a similar language description, which can then be output to the flexible computing hardware directly from the description. Flexible computing architectures offer the advantage that subsequent changes to the XNN can be made and re-implemented multiple times. Flexible computing architectures also offer significantly higher performance per watt than a general computing architecture, thus allowing an exemplary embodiment to process significantly larger quantities of data using less power. Flexible computing architectures also allow for easy training of XNNs using gradient descent methods such as back-propagation.

Flexible computing architectures also allow advanced XNN methods such as dynamic architecture adaptation using Genetic Algorithms (GAs) and Monte Carlo Simulation Methods (MCSM) or related techniques and alternatives to be implemented fully in hardware. An exemplary embodiment may implement a network adaptation algorithm on one part of the flexible computing architecture or using a separate interconnected flexible computing architecture, and then have the original XNN reprogrammed dynamically.

Extra unused connections, neurons and layers may be added and may be activated and changed dynamically as a result of an XNN adaptation algorithm.

Flexible computing architectures may also be used to simultaneously implement different XNN variants on the same hardware or a system with interconnected FPGAs, for example, having a training optimized hardware XNN together with a sparse XNN that is optimized for throughput. This will allow the FPGA based system to be able to create, train and optimize hardware XNNs during the course of its operation without requiring multiple restarts while achieving high performance during runtime nominal operation.

XNNs may also be implemented in hardware using Fixed Resource Models, which can make them ideal to run on top of Real Time Operating Systems (RTOS) and Robotic Operating Systems (ROS). For reference, fixed-resource logic operates on data provided in a flow, and a device implementing a Fixed Resource Model may receive a flow item through an input port, do something to the flow item, and then release the flow item to be sent on through an output port. An exemplary implementation may have a Fixed Resource Model open an input port, find a flow item to receive (if it is in "pull mode"), execute a "pull strategy" function if it is, and identify an item to pull based on the pull strategy (or may alternatively wait for a first flow item to become available if none can be selected). Once pulled, the flow item may be processed according to the type of fixed resource it is classified as, and then released, transferring the flow item to the next station. It may be contemplated that dedicated XNN Acceleration Hardware or one or more XNN Processing Units (XPU) may be available in practical implementations to accelerate parts or all of an XNN. In an exemplary embodiment, an XPU may be used to accelerate the prediction network or the conditional network or both parts of an XNN. It may be further contemplated that Induction Process Acceleration Hardware or Induction Processing Unit (IPU) may be available in practical implementations to accelerate the Induction Process used to convert black-box AI predictor models to white-box explainable models, including direct conversion to an XNN. In an exemplary embodiment, an IPU may be used to accelerate hierarchical partitioning discovery, merging and splitting, and the faster generation of appropriate rules, linear and non-linear model fitting and other appropriate parts or all of the Induction Process. It is further contemplated that an Explainable Processing Unit (EPU) may be used to accelerate the creation and output processing steps involved in creating an explanation in a Universal Explanation Format. In an exemplary embodiment, an EPU may be used to accelerate the creation of a hierarchically structured explanation output, faster linking with an ontological structure, and faster linking with a reverse indexing mechanism for tabular, textual and image data.

Coefficients in a dense XNN may be zero-valued, with the result having more nodes and connections. Since the zero-valued coefficients are still connections, the result may therefore be a dense network—the number of possible links has been maximized. On the other hand, in a sparse XNN, zero-valued coefficients may be eliminated, which results in a more compact network. Thus, a dense system of equations used as the basis of a sparse XNN, in which zero-valued coefficients are eliminated and the system of equations has entirely nonzero elements, may produce a sparse network, such as the exemplary embodiment in FIG. 5, since the number of possible links is lower than it could be. The reverse may also be true, and the use of a sparse system of equations, in which most elements are zero, may produce a dense network in which connections between all cells are maintained, as shown in the exemplary dense XNN architecture illustrated in FIG. 6.

Referring now to exemplary FIG. 5, FIG. 5 may illustrate an exemplary sparse XNN architecture. A sparse XNN may include a conditional network 110 and a prediction network 120, which may include transformed features 500, resulting rules 306, and the value output layer 308.

The prediction network 120 in a sparse XNN may apply the dot product between the input 500 and the weights 304. The result is equivalent to solving a linear function such as: $R_0=\beta_0+\beta_1 x+\beta_2 y+\beta_3 xy$. This is equivalent to the exemplary dot product:

$$\begin{bmatrix} \beta_0 \\ \beta_1 \\ \beta_2 \\ \beta_3 \end{bmatrix} \cdot [1 \ x \ y \ xy] = [R_0]$$

Such dot product may be represented by the prediction/value network 120. In a neural network, the intercept of a linear equation may be represented with a separate bias vector. Both dense and sparse XNNs support rule refinement through incremental learning with gradient descent methods such as back propagation. While a sparse network architecture may be more complex to construct, it may be ideal for low-memory footprint, low-powered hardware, and edge processing, pruned rules with zero-valued coefficients, or for preventing overfitting with zero-valued coefficients. Further, sparse XNNs may employ efficient processing techniques and are ideal for both large and small datasets.

The exemplary XNN architecture in FIG. 5 is logically equivalent to the following system of equations:

$$f(x, y) = \begin{cases} \text{Sigmoid}(\beta_0 + \beta_1 x + \beta_2 y + \beta_3 xy), & x \leq 10 \\ \text{Sigmoid}(\beta_4 + \beta_5 xy), & x > 10 \land x \leq 20 \\ \text{Sigmoid}(\beta_6 + \beta_7 x^2 + \beta_8 y^2), & x > 20 \land y \leq 15 \\ \text{Sigmoid}(\beta_9 + \beta_{10} y), & x > 20 \land y > 15 \end{cases}$$

In an exemplary dense XNN, every neuron in one layer may be fully connected to each neuron in the proceeding layer. Referring now to exemplary FIG. 6, FIG. 6 may illustrate an exemplary dense XNN architecture. The dense XNN may include the same components as the sparse XNN, such as a prediction network 120 and a conditional network 110. However, the prediction network 120 in the dense XNN may differ from that of a sparse XNN in that the nodes in one layer are fully connected to each node in another layer, even if the connection is via a zero-value weight, or coefficient as represented by the ruleset. For example, each node in the transformed feature layer 500 is connected to each rule output value in the resulting rule 306 in the next layer.

The difference between a sparse and a dense XNN may be the way the dot product is calculated. For example, in a dense XNN, although the exemplary diagram shows two separate steps 306 and 308 for visual purposes, may actually perform this as one step. In this exemplary step 306/308, matrix multiplication is performed between the weight/coefficient matrix and the vector/matrix of inputs/transformed values 500. The intercept of the equation may also be represented as a separate vector of biases. An exemplary matrix multiplication of the coefficient matrix and transformed values may be:

$$\begin{bmatrix} \beta_{0,0} & \beta_{0,1} & \beta_{0,2} & \beta_{0,3} \\ \beta_{1,0} & \beta_{1,1} & \beta_{1,2} & \beta_{1,3} \\ \beta_{2,0} & \beta_{2,1} & \beta_{2,2} & \beta_{2,3} \\ \beta_{3,0} & \beta_{3,1} & \beta_{3,2} & \beta_{3,3} \\ \beta_{4,0} & \beta_{4,1} & \beta_{4,2} & \beta_{4,3} \\ \beta_{5,0} & \beta_{5,1} & \beta_{5,2} & \beta_{5,3} \end{bmatrix} \cdot [1 \ x \ y \ x^2 \ y^2 \ xy] = [R_0 \ R_1 \ R_2 \ R_3]$$

$$R_0 = \beta_{0,0} + \beta_{1,0}x + \beta_{2,0}y + \beta_{3,0}x^2 + \beta_{4,0}y^2 + \beta_{5,0}xy$$
$$R_1 = \beta_{0,1} + \beta_{1,1}x + \beta_{2,1}y + \beta_{3,1}x^2 + \beta_{4,1}y^2 + \beta_{5,1}xy$$
$$R_2 = \beta_{0,2} + \beta_{1,2}x + \beta_{2,2}y + \beta_{3,2}x^2 + \beta_{4,2}y^2 + \beta_{5,2}xy$$
$$R_3 = \beta_{0,3} + \beta_{1,3}x + \beta_{2,3}y + \beta_{3,3}x^2 + \beta_{4,3}y^2 + \beta_{5,3}xy$$

Alternatively, in a sparse XNN, the dot product may be split into multiple dot products and combined into one layer. Each rule is calculated separately, using a separate dot product. For example:

$$\begin{bmatrix} \beta_0 \\ \beta_1 \\ \beta_2 \\ \beta_3 \end{bmatrix} \cdot [1 \ x \ y \ xy] = [R_0]$$

$$\begin{bmatrix} \beta_4 \\ \beta_5 \end{bmatrix} \cdot [1 \ xy] = [R_1]$$

$$\begin{bmatrix} \beta_6 \\ \beta_7 \\ \beta_8 \end{bmatrix} \cdot [1 \ x^2 \ y^2] = [R_2]$$

$$\begin{bmatrix} \beta_9 \\ \beta_{10} \end{bmatrix} \cdot [1 \ y] = [R_1]$$

Finally, the prediction network of the sparse XNN concatenates the output vectors into one vector 308 [$R_0, R_1, R_2, R_3$] so that matrix multiplication could be applied with the switch output in step 700.

Like a sparse XNN, a dense XNN may still support rule refinement through incremental learning with gradient descent methods such as back propagation. However, the network architecture of dense XNNs may be simpler to construct as compared to the sparse XNNs. Dense XNNs may be ideal for high-powered hardware, rules with non-zero-valued coefficients and for implementing or analyzing high dimensional data. Dense XNNs may be efficient for GPU processing and are ideal for both small and large datasets. Sparse XNNs may be useful for restricting training with regularization while dense XNNs may be useful for serving predictions and explanations.

The exemplary dense XNN illustrated in FIG. 6 is logically equivalent to the following system of equations:

$$f(x, y) = \begin{cases} \text{Sigmoid}(\beta_{0,0} + \beta_{1,0}x + \beta_{2,0}y + \beta_{3,0}x^2 + \beta_{4,0}y^2 + \beta_{5,0}xy), & x \leq 10 \\ \text{Sigmoid}(\beta_{0,1} + \beta_{1,1}x + \beta_{2,1}y + \beta_{3,1}x^2 + \beta_{4,1}y^2 + \beta_{5,1}xy), & x > 10 \wedge x \leq 20 \\ \text{Sigmoid}(\beta_{0,2} + \beta_{1,2}x + \beta_{2,2}y + \beta_{3,2}x^2 + \beta_{4,2}y^2 + \beta_{5,2}xy), & x > 20 \wedge y \leq 15 \\ \text{Sigmoid}(\beta_{0,3} + \beta_{1,3}x + \beta_{2,3}y + \beta_{3,3}x^2 + \beta_{4,3}y^2 + \beta_{5,3}xy), & x > 20 \wedge y > 15 \end{cases}$$

A dense network is logically equivalent to a sparse network after zeroing the unused features. Therefore, to convert a sparse XNN to a dense XNN, additional features may be added which are multiplied by coefficient weights of 0. Additionally, to convert from a dense XNN to a sparse XNN, the features with coefficient weights of 0 are removed from the equation.

For example, the dense XNN in FIG. 6 is logically equivalent to the following system of equations:

$$f(x, y) = \begin{cases} \text{Sigmoid}(\beta_{0,0} + \beta_{1,0}x + \beta_{2,0}y + 0x^2 + 0y^2 + \beta_{4,0}xy), & x \leq 10 \\ \text{Sigmoid}(\beta_{0,1} + 0x + 0y + 0x^2 + 0y^2 + \beta_{5,1}xy), & x > 10 \wedge x \leq 20 \\ \text{Sigmoid}(\beta_{0,2} + 0x + 0y + \beta_{3,2}x^2 + \beta_{4,2}y^2 + 0xy), & x > 20 \wedge y \leq 15 \\ \text{Sigmoid}(\beta_{0,3} + 0x + \beta_{2,3}y + 0x^2 + 0y^2 + 0xy), & x > 20 \wedge y > 15 \end{cases}$$

Which can be simplified to:

$$f(x, y) = \begin{cases} \text{Sigmoid}(\beta_0 + \beta_1 x + \beta_2 y + \beta_3 xy), & x \leq 10 \\ \text{Sigmoid}(\beta_4 + \beta_5 xy +), & x > 10 \wedge x \leq 20 \\ \text{Sigmoid}(\beta_6 + \beta_7 x^2 + \beta_8 y^2), & x > 20 \wedge y \leq 15 \\ \text{Sigmoid}(\beta_9 + \beta_{10} y), & x > 20 \wedge y > 15 \end{cases}$$

The logical equivalence applies to the feed forward pass. Once a network is converted to a dense XNN, and training is applied to it, zero-valued weights (i.e., coefficients) may be updated through backpropagation.

Referring now to exemplary FIG. 2, FIG. 2 may show a comparison of a dense XNN and a sparse XNN which implement the same model. The use of one or the other depends on the use case. For instance, a sparse XNN may be used during training to restrict certain coefficients from becoming a non-zero value, which makes it possible to maintain a simpler model which had been regularized or compressed. Once training or refinement is applied, the sparse XNN may be converted to a dense XNN, which is fully connected in order to have a simpler network for serving predictions and explanations, which may result in faster execution times. Sparse networks may be slightly more complex to construct and execute but use less memory, making them suitable for applications where memory and space are of a major concern. These space and time and performance tradeoff guidelines may be initially used to select the best type of XNN for a particular application. Additional testing of the different variants on a case-by-case basis is recommended to determine the optimal architecture, as the XNN variants may be optimized for training ease, load time, memory and space utilization, execution speed, etc.

An exemplary embodiment may implement an XNN as an ASIC or similar static circuit by either a direct translation of the general XNN into circuitry or by first applying a desired XNN transform, such as a dense or sparse transform to the XNN, and then converting the transformed XNN into circuitry.

The general process of converting a neural network into conventional ASIC circuitry is well known as XNNs follow standard ANN implementations. No additional specialized circuits are needed to implement XNNs as ASICs and related circuits. Possible practical implementation involves creating a VHDL or similar language description for the XNN and then converting this into an ASIC circuit.

An ASIC-implemented XNN may take advantage of unique XNN triggering capabilities, which may be utilized to control other hardware or software systems in real-time or quasi-real-time. An exemplary embodiment may implement an appropriate control bus or channel and the appropriate handling of control and triggering signals within the resulting system.

ASIC and related static implementations are likely to offer significant speed and performance advantages for hardware XNNs. Certain techniques that are available for XNNs, such as dynamic network adaptation and optimization, will not be fully available for such implementations due to the fixed nature of such implementations. Some form of flexibility can be achieved by having adequate dynamic memory or external storage available that allows for additional redundancy and capacity to be implemented within the hardware XNN to allow for a degree of network adaptation and possibly also allow some degree of training if the weights are implemented dynamically rather than statically hard-coded within the circuitry.

The static nature of an ASIC implementation has a distinct advantage when it comes to guaranteeing that Human Knowledge Injection (HKI) derived directives that should be always static and unchanging are actually impossible for the AI system to change. This may be an advantage for systems that need to be guaranteed safe in their operation or as part of a simpler independent failsafe system that monitors a more complex system to ensure compliance with safety, ethical, trustworthiness parameters and other important considerations that may need to be imposed and hard coded within the AI system without sacrificing overall adaptability and learning of such a system.

For example, a possible ASIC deployment of a hardware XNN is in a safety and ethical watchdog chip or kill switch system that quickly processes the current state of an autonomous system and that is capable of quickly activating an emergency failsafe state if it detects or predicts possible harm to people.

Analog electronics or a mix of analog-digital electronics can be used to implement hardware XNNs, in a similar way to the ASIC implementations. Analog electronics may implement hardware such as a sensor input, leading to new types of sensors that combine intelligent processing and explanations in a single package without the need for a central computing unit or similar circuit.

An exemplary distributed method of hardware XNN deployment can lead to significant advantages in an edge computing or IoT deployment environment. For example, in robotic and industrial applications, such an implementation may achieve even higher power saving and higher performance than an ASIC or other implementation.

An exemplary embodiment may be a fully analog implementation of an XNN. Analog methods may replace activation functions in the neurons and neuron activations may be represented as analog voltages, spikes, or similar techniques. An exemplary embodiment may use a combination of analog and digital electronics to transform the analog real-world input to a format that is amenable for further digital processing. The flexibility of XNNs makes them ideal for a variety of applications, such as fast, low-power digital signal processing of analog sensor data. An exemplary embodiment may extract meaning from signals and pass on the relevant parts of the data together with a digital explanation to more complex processing in the pipeline.

An exemplary embodiment may implement conventional discrete components. Such implementations may be useful for smaller XNNs. The advantages and disadvantages of such an implementation are similar for ASIC and related implementations. Cost and robustness considerations may make this type of implementation attractive, for example, when high power systems are involved or when a simple XNN is needed for basic control or safety monitoring.

The sparse XNN transform is highly suitable for this exemplary implementation and can be used to rapidly prototype and test different designs on actual hardware before going forward with more expensive ASIC or FPGA implementations. A potential use of this type of implementation would be to rapidly test potential hardware characteristics of circuits that may not be easily simulated in software.

Another exemplary embodiment may implement spintronics. Spintronics intertwine memory and computing components leading to a potentially more efficient hardware implementation since there does not need to be much, if any, transfer of memory values, weights, etc. during operation.

Spintronic XNN implementations may have similar characteristics to an FPGA implementation if they are reprogrammable. Non-reprogrammable spintronics may have similar characteristics to ASICs.

XNNs can be efficiently implemented using spintronics by converting all the different layers and neurons in the XNN to a spintronic circuit. Spintronic implementations of predictive XNNs and related predictive variants may be particularly efficient in practice due to the conflation of memory and processing that is available in a spintronic circuit. Faster data access and the elimination or reduction of having computationally expensive data transfer requests over a data bus can significantly improve the performance of XNNs and all their variants. In case of predictive XNN varieties, the amount of input data, being a stream or series rather than just a single snapshot, may be magnitudes higher and thus the performance gains are multiplied and amplified.

Neuromorphic chips also intertwine memory and processing in a similar manner to spintronics. XNNs can be implemented highly efficiently on neuromorphic chips as they can implement neural networks directly in hardware. Hardware XNNs running on neuromorphic chips may be efficient while having all the advantages and flexibility of a general computing architecture. Practical embodiments of hardware XNNs on neuromorphic chips may not require major changes to an XNN deployed on a standard CPU/GPU combination.

It may be further envisaged that an XNN implementation on neuromorphic chips may employ spiking neurons rather than the more common activation function-based neurons. Spiking neurons within an XNN implementation may increase the power efficiency and processing throughput very significantly, making some practical applications feasible that would otherwise be unfeasible with non-spiking neurons.

One of the main advantages of using white-box XNNs over black-box ANNs and other black-box systems is that their interpretability provides for the implementation of intelligent transformation methods that optimize the XNN architecture for a particular deployment while preserving the logical structure and function of the underlying model. There are different implementation choices when it comes to XNNs including the ability to optimize it for trainability, speed, performance, etc. which is especially important in a predominantly hardware or a hardware only implementation. The sparse, dense, and micro XNN variants also have significant implications on hardware implementations of XNNs.

While a sparse network architecture may be more complex to construct, it may be ideal for low-memory footprint, low-powered hardware, and edge processing, pruned rules with zero-valued coefficients, or for preventing overfitting with zero-valued coefficients. Further, sparse XNNs may employ efficient CPU processing techniques and are ideal for both large and small datasets. In an exemplary embodiment for medical imaging, an XNN may be used to classify and explain an X-ray image or an MRI scan.

Dense and sparse XNNs may be applied to the different stages of the model lifecycle. In an exemplary embodiment, an XAI model may be converted to an XNN after the initial model induction. It may then be required to convert the XAI model to a sparse XNN in order to refine the model in a global manner. FIG. 5 illustrates a typical sparse XNN architecture that may be implemented directly in hardware. FIG. 6 illustrates a typical dense XNN architecture that may be implemented directly in hardware.

The sparse XNN enables the XNN to take advantage of the regularization and compression which is already part of the XAI model. Once the model is fully trained, it may then be useful to convert the sparse XNN model to a dense XNN model in order to deploy in a production environment whereby a simpler architecture is needed in order to serve fast classifications and explanations. It may also be noted that in this embodiment, sparse XNNs and dense XNNs may provide different levels of accuracy. In this exemplary embodiment, hardware resources may be sacrificed to increase model performance (accuracy), as needed. Such trade-offs may be applied on a case-by-case basis. In an exemplary embodiment, a dense XNN may be implemented as part of a large-scale MRI scanner, while a sparse XNN may be implemented as part of a smaller portable device.

Micro XNNs employ techniques similar to those of a sparse network but are split up into multiple micro networks. These micro networks are the XNN equivalent of modules in traditional software engineering, allowing neural networks to be structured according to best practice modular design. Micro XNNs may work in feed-forward pass and might not support rule refinement through gradient descent methods such as back propagation. As such, micro XNNs may be best suited for deployment in production type environments or for conversion to fixed hardware circuits such as ASICs, neuromorphic chips, or analog/digital circuitry. Micro XNNs can be used for serving predictions and explanations. One or more micro XNNs may be implemented in low-memory footprint, low-powered hardware, and edge processing. A micro XNN can process high-dimensional data and can process fast transactional predictions and explanations. Back propagation and related techniques can still be used in conjunction with micro XNNs by utilizing a simple transformation step from micro XNNs to one of the other XNN variants, such as sparse XNNs or dense XNNs, running the backward pass process and then re-converting back to micro XNN format without any loss of information whatsoever.

Further to the exemplary medical imaging embodiment, an alternative deployment may be required on a hand-held device that is low-powered. In this exemplary use case, a micro XNN may be suitable as it may require fewer low-hardware resources to process classifications and explanations.

The choice of XNN transform to apply for a hardware XNN implementation depends on the application domain together with the hardware, resource, performance, and other engineering constraints.

Referring now to exemplary FIG. 2, FIG. 2 may show a comparison of a dense XNN 210 and a sparse XNN 220 which implement the same rule-based model. The use of one or the other depends on the use case. For instance, a sparse XNN 220 may be used during training to restrict certain coefficients from becoming a non-zero value, which makes it possible to maintain a simpler model which had been regularized or compressed. Once training or refinement is applied, the sparse XNN 220 may be converted to a dense XNN 210, which is fully connected in order to have a simpler network for serving predictions and explanations, which may result in faster execution times. Sparse networks may be slightly more complex to construct and execute but use less memory, making them suitable for applications where memory and space are of a major concern. These space and time and performance tradeoff guidelines may be initially used to select the best type of XNN for a particular application. Additional testing of the different variants on a case-by-case basis is recommended to determine the optimal architecture, as the XNN variants may be optimized for training ease, load time, memory and space utilization, execution speed, etc.

In an exemplary embodiment for medical imaging, an XNN may be used to classify and explain an X-ray image or an MRI scan. Dense and sparse XNNs may be applied to the different stages of the model lifecycle. It may be suitable for this particular use case that an XAI model is converted to an XNN after the initial model induction. It may then be required to convert the XAI model to a sparse XNN in order to refine the model in a global manner. The sparse XNN may take advantage of the regularization and compression which is already part of the XAI model. Once the model is fully trained, it may then be useful to convert the sparse XNN model to a dense XNN model, depending on the application, such as in a production environment whereby a simpler architecture is needed in order to serve fast classifications and explanations (for example, a dense XNN may be best suited in an implementation of GPU hardware, as noted above). It may also be noted that in this embodiment, a sparse XNN and a dense XNN may provide different levels of accuracy. In this scenario, hardware resources may be sacrificed to increase model performance (accuracy), as needed. Such trade-offs may be applied on a case-by-case basis. In an exemplary embodiment, a dense XNN may be implemented as part of a large-scale MRI scanner, while a sparse XNN may be implemented as part of a smaller portable device.

Micro XNNs may be best suited for deployment in production type environments or for conversion to fixed hardware circuits such as ASICs, neuromorphic chips, or analog/digital circuitry. Micro XNNs can be used for serving predictions and explanations. One or more micro XNNs may be implemented in low-memory footprint, low-powered hardware, and edge processing. A micro XNN can process high-dimensional data and can process fast transactional predictions and explanations. Back propagation and related techniques can still be used in conjunction with micro XNNs by utilizing a simple transformation step from micro XNNs to one of the other XNN variants, such as sparse XNNs or dense XNNs, running the backward pass process and then re-converting back to micro XNN format without any loss of information whatsoever.

Further to the exemplary medical imaging embodiment, an alternative deployment may be provided on a hand-held device that is low-powered. In this exemplary use case, a micro XNN may be suitable as it may require fewer low-hardware resources to process classifications and explanations.

Referring now to the exemplary embodiment in FIG. 3, FIG. 3 may illustrate four exemplary value micro-networks 300. An XNN network may combine one or more micro-networks where the feed-forward pass is broken down into smaller parts. Take, for example, the prediction networks illustrated in FIG. 3. Once a prediction network is evaluated, the results of the switch output layer, $S_0$ to $S_3$, may determine which value network to execute. Separate micro networks may be used for the value network.

For example, the value network for rule $R_0$ triggers if $S_0$ is triggered, the value network for rule $R_1$ triggers if $S_1$ is triggered, the value network for rule $R_2$ triggers if $S_2$ is triggered, and the value network for rule $R_3$ triggers if $S_3$ is triggered.

Referring to the exemplary embodiment in FIG. 4, FIG. 4 may illustrate a flowchart showing an exemplary combined micro XNN architecture to form a micro neural network. The conditional network 110 may be its own micro XNN and may interface with the separate value network micro XNNs 300. This allows for best practices in software engineering to be reflected in the XNN design. Modularization in this precise and functional manner is only possible in XNNs due to their white-box nature. Each micro-network 300 may be implemented on a separate hardware. For example, the hardware could be a low-power chip. The conditional network 110 may also be implemented on separate hardware. The main difference between an XNN and a set of micro XNNs is that each sub network in the set of micro neural network is constructed in a manner such that it may operate independently by having a complete data flow, from input, transformation (such as polynomial) to the output prediction. The data flow path followed by the micro neural network, starting from a particular input and ending in the appropriate output prediction, describes the activation path for that particular input and output combination. Activation paths for multiple input and output combinations can always be decomposed into a set of activation paths, each for a single input and output combination. For a deterministic micro neural network, there may be a unique activation path for each input and output combination. For a non-deterministic micro neural network, such as is the case with an XNN containing overlapping partitions, there may be one or more activation paths for each input and output combination, necessitating some optional form of ranking, probability or other form of prioritization for the activation path branches.

In an exemplary embodiment, the switch output layer 116 is also initialized by the same external process that defines the XNN and may be implemented as the same process that initializes the aggregation layer 114, although it may be contemplated that these processes may be independent if necessary. All values in the connection weights between the neurons can be updateable using standard neural network training techniques. XNNs provide a further novel method of updating the connections themselves using machine learning methods such as genetic algorithms, Monte Carlo simulation methods, Particle Swarm Optimization (PSO), Multiple Objective Optimization (MOO), simulated annealing, reinforcement learning, etc. or via causal logic models.

XNNs may be implemented and realized in hardware on various types of hardware architectures. FIG. 8 illustrates an exemplary embodiment using hardware architectures that do not necessitate real-time external input or other form of sensory input, also known as a sensor-less hardware architecture. FIG. 9 illustrates an exemplary embodiment using hardware architectures that provide real-time environmental input or other form of sensory input, also known as sensor-based or sensored hardware architecture. Note that in both FIG. 8 and FIG. 9, the feedback controller 870 is shown both as part of the main hardware system 802 or as part of the output system 803 as it may be interpreted and implemented in different ways with either an internal feedback system or an external feedback system (such as an electro-mechanical controller) that feeds back to the system, or potentially both types simultaneously (in which case the feedback controller 870 may be potentially implemented as multiple controllers). An exemplary XNN implementation may be implemented as illustrated in FIG. 8 or FIG. 9.

FIG. 8 illustrates an exemplary sensor-less hardware system 802 together with optional output modules 803. The sensor-less hardware implementation 802 may include a component 810 in the form of internal circuitry, clocks, data tables, etc. that may control the process and provide internal parameters to the XNN input layer 100. The XNN implementation 830 is comprised of three main parts, the conditional network 110, the prediction network 120, and the ranking layer 128. The XNN 830 outputs an answer and explanation as illustrated by the XNN output component 130. The XNN output 130 may optionally be connected to any of a combination of output methods 803. The output methods 803 may be comprised of any combination of: hardware that supports non-real-time output, such as storage based output, packet network transmissions, etc. as illustrated in components 850 and 851; hardware that supports real-time or quasi real-time output and/or control signals, such as displays, actuators, relays, hard-wired dedicated networks and fly-by-wire systems, etc. as illustrated in components 860 and 861; hardware that supports feedback 870, which may optionally be treated as a form of output like components 850 or 860. Feedback 870 may further take the form of closed loop, open loop, feed-forward feedback, etc. Feedback may be connected to the XNN input layer 100 to complete the feedback loop.

The exemplary embodiment in FIG. 9 may illustrate an optional non-sensor input 800, optional sensor input 801, main sensor-based or sensored hardware system 804, and optional output methods 803. Note that for sensor-based hardware at least one of components 800 or 801 needs to be implemented (otherwise the implementation would fall under the sensor-less category as depicted by FIG. 8). Non-sensor data 800 may come from external storage, network communication, relay, or external bus data, etc. Sensor data 801 may typically come from local sensors that may typically be hard-wired into a local bus or convertor or relay or some other method of transferring sensory data into the sensored hardware system 804. The sensor-based hardware implementation 804 in turn has a component 810 in the form of internal circuitry, clocks, data tables, etc. that may help control the process and provide internal parameters to the XNN input layer 100. For sensored hardware implementations, component 810 may be optional as the implementation may rely exclusively on the input data coming from components 800 and/or 801. The XNN implementation 830 is comprised of three main parts, the conditional network 110, the prediction network 120, and the ranking layer 128. The XNN 830 outputs an answer and explanation as illustrated by the XNN output component 130. The XNN output 130 may optionally be connected to any of a combination of output methods 803. The output methods 803 may be comprised of a combination of: hardware that supports non-real-time output, such as storage based output, packet network transmissions, etc. as illustrated in components 850 and 851; hardware that supports real-time or quasi real-time output and/or control signals, such as displays, actuators, relays, hard-wired dedicated networks and fly-by-wire systems, etc. as illustrated in components 860 and 861; hardware that supports feedback 870, which may optionally be treated as a form of output like components 850 or 860. Feedback 870 may further take the form of closed loop, open loop, feed-forward feedback, etc. Feedback may be connected to the XNN input layer 100 to complete the feedback loop. In sensor-based hardware the feedback loop may be completed by connecting component 870 back to 810 (or even 800, depending on the implementation) instead of directly to the XNN input layer 100.

FIG. 8 and FIG. 9 illustrate exemplary implementations and do not cover all implementation possibilities. Combinations of all the different types of hardware architectures and features including but not limited to combinations of some or all of sensor-less 802 and sensored hardware 804, and components 800, 801, 803, 850, 851, 860, 861 and 870, together with any other practical implementation options may also be considered. The XNN implementation 830 itself may have a combination or conflation of components 100, 110, 120, 130 in any combination in the actual hardware implementation. Other further combination of hardware components is contemplated to be possible, for example, by implementing component 810 and 100 using the same hardware component.

In the case of sensor-less hardware, it is contemplated that a possible embodiment of an XNN system that has output options may be practically achieved with a combination of mechanical methods, the mechanics of the task or application at hand, and/or using the elapsed time using an internal clock to determine the appropriate state space or other input information needed for correct functioning of such a sensor-less system. For example, the implementation illustrated in FIG. 8 may have an internal timer and a table of scheduled movements according to time offsets as component 810.

An exploration of how such sensor-less implementations (or a combination of sensored and sensor-less systems) can be used to achieve practical solutions to various applications needing hardware and/or control systems is given in "An Exploration of Sensorless Manipulation" (Erdmann and Mason, 1988). For example, the theoretical industrial tray manipulation example given by Erdmann and Mason to orient manufacturing objects in a sensor-less manner may finally be implemented in practice using a modern neural network by training an XNN to perform the required manipulations and embedding it within the controller system. In Erdmann and Mason's example, an XNN solution may be built using a sensor-less implementation such as the one illustrated in FIG. 8, with real-time output 860 controlling an actuator 861 without any need for components 850, 851 or 870.

XNNs may also automatically confer an additional advantage that may not have been previously possible. Apart from performing the manipulation, the system may also explain why the specific angles and duration of each manipulation are carried out. Further, the system may be able to interface with some kind of visualization system or some other form of operational awareness system that allows operators to understand the behavior of such a system. XNNs also confer the advantage of being predictable and interpretable. The simulation of the entire XNN behavioral state may ensure a guarantee of a safe and reliable mode of operation or at least some form of better understanding of the risks involved, which may be crucial in settings like the object and tray manipulation example, where an error may cause objects to fall outside of their desired place and potentially injure bystanders. The identification and explanation of such erroneous and potentially unsafe states may then be either corrected in the XNN or additional measures taken to mitigate or eliminate such risk.

Hardware XNN implementations may also allow modern AI systems to reach a higher Evaluation Assurance Level (EAL) in the ISO/IEC 15408 standard and also within the context of the Common Criteria Recognition Arrangement (CCRA). Due to the black-box nature of modern Deep Learning AI, most systems based on such black-box methods cannot achieve an EAL rating higher than EAL1 and may possibly barely be acceptable for EAL2. The white-box and fully understandable and predictable behavior of XNNs allow for straightforward certification at the EAL1 to EAL4 levels. XNNs, in combination with white-box Behavioral Models, also allow certification at the higher and more difficult to achieve EAL5 to EAL7 levels, which is the highest level of verification and testing that can be achieved within practical quality assurance frameworks commonly in use world-wide. XNN-based AI system implementations can thus allow users to acquire a higher level of confidence that the system's principal security features are reliably implemented, by meeting specific assurance requirements. Typically, the functional features for each certified product or system are established in a Security Target document tailored for the EAL evaluation. Thus, a system's fitness for purpose for a particular security application depends on how well the features listed in the appropriate Security Target fulfill the application's actual security requirements. White-box systems like XNNs can be analyzed and predicted using both semi-formal and formal methods, which is something that is out of scope for black-box systems. This inherent EAL related benefit for XNNs allows hardware AI devices based on XNNs to achieve successful EAL evaluations that are otherwise impossible to achieve. The EAL related benefits also apply to other similar contexts, such as the US FIPS 140-2, UK CESG Assisted Products Scheme (CAPS), the ISO/IEC 27001 standard and other applicable national and international standards and treaties.

In an exemplary embodiment, XNN-based hardware that incorporates event-driven sensors and/or that supports some form of AI filter or operation at a hardware sensor level may take advantage of the white-box nature of XNNs to improve the quality and performance of the implemented system. For example, an XNN may be used to process event-driven multi-dimensional data streams that may be segmented by time and/or events in such implementations, in some exemplary embodiments in an incremental fashion, supporting both feed forward processing and simultaneous updates of the XNN explanation based reverse indexing capabilities without having to process an entire input data frame. In a further example, an XNN may be used to directly utilize pre-processed or partially processed input data and correctly perform a combination of fusion, routing, transformation, dimensionality reduction and/or flatten operations, taking advantage of the white-box nature of XNNs to do so correctly and efficiently.

It is further contemplated that a hardware XNN implementation may also be utilized to implement the end output resulting from the HKI process. In some cases, such as safety boundaries, ethical applications and safety applications, the incorporation of such human provided rules and information may prove beneficial. A secure processor, secure crypto-processor, hardware security module, trusted platform module or appropriate hardware device may be used for such implementation. An exemplary application may be in a factory or warehouse utilizing autonomous robots that adapt to changing environments, where people may come into close vicinity of such robots. The safety parameters loaded into the robot's behavioral model, linked to the explainable system controlling such robot may be coded in a secure processing hardware environment to provide an element of tamper proofing, as tampering in such an application may lead to potentially unsafe situations for the people interacting with the robots.

An exemplary embodiment may implement the HKI methods and techniques within a neuromorphic hardware architecture. Explainable models, such as XNNs, may in some exemplary embodiments allow neuromorphic architectures to be made understandable by presenting a white-box model that can be further presented to people in the form of rules and/or workflows. This surface representation form can be edited and then seamlessly reconverted back into the neural, connectionist format that is needed for neuromorphic hardware. Such an exemplary embodiment provides a practical solution for editing, adding, and deleting relevant information and consequently changing the behavior of neuromorphic devices in a controlled, reliable, and replicable manner.

An exemplary embodiment may implement an XNN using a quantum processing system. It is contemplated that an explainable model implemented on a quantum processing system will have rules that are similar to classical explainable models with the addition of quantum specific extensions. For example, such an extension may allow for the specification of quantum annealing effects and their correct interpretation. In another example, an extension may allow for the correct interpretation of multiple qubit states, qubit basis states, mixed states, Ancilla bits, and other relevant quantum effects due to entanglement and/or decoherence. In another example, an extension may allow for the introduction of quantum logic specific operators and/or hardware logic gates within an XNN, such as quantum controlled-not (CNOT) gates, controlled-swap (CSWAP) gates, Ising XX, YY, or ZZ coupling gates, Pauli gates, Hadamard gates, Toffoli gates and other relevant quantum logic operations that may be combined serially or in parallel.

An exemplary embodiment may use the HKI methods and techniques within an Explanation and Interpretation Generation System (EIGS), allowing for seamless bi-directional collaboration to be achieved within an EIGS based system.

In an exemplary embodiment, XNNs may also be used as the basis of a practical data privacy preserving AI system implementation. Data privacy may be violated intentionally or unintentionally by AI systems in a number of scenarios: (i.) personal data from training datasets unintentionally incorporated in AI models; (ii.) personal data can be re-extracted or re-created by analyzing the model answers repeatedly; (iii.) personal data of certain uniquely identifiable groups may end up at a higher risk of identification; (iv.) model inversion and membership inference techniques, that can associate model data via a unique key or signature; (v.) other sources of information, such as public data sources, can be combined with private information to re-create or otherwise identify private information. The main data privacy preserving solutions for AI can be classified under four categories: (i.) differential privacy; (ii.) secure multi-party computation; (iii.) federated learning; (iv.) homomorphic encryption. Exemplary embodiments of XNNs may enable practical implementations under all four categories.

In privacy preserving solution (i.), differential privacy, the introduction of noise in the training data or some other suitable means of obfuscation, may be used to generate a controllable amount of privacy through a noise factor or ratio, in the AI model. Exemplary embodiments of XNNs, with their selective deletion and editing capabilities, can add such noise selectively according to a data privacy model. Data owners have the added advantage of having control over the noise level added to the model, thus making it a superior solution to what can be achieved via a black-box. The audit trail functions of an XNN can also be used to detect an anti-obfuscation attack and generate noisy information on purpose to defeat such an attack to prevent private information from being identified through repeat querying of the same data row.

In privacy preserving solution (ii.), secure multi-party computation (SMPC) may be used to obtain a correct answer while concealing partial information about data yet simultaneously computing the answer using data from many sources. XNNs can extend SMPC protocols to cover explanation generation apart from answer output. Commonly used protocols for SMPC implementations, such as the SPDZ protocol, typically allow operations such as combinations of additions and multiplications between two secretly shared numbers. Exemplary embodiments of XNNs that utilize a polynomial basis for the fit layer and that have hierarchical partition functions that can be described using a sequence of additions and multiplications may thus be beneficially applied to SMPC implementations. Additionally, due to their white-box nature, XNNs can be analyzed and tested formally for security and trust building purposes without revealing any secrets. A secure enclave may also be used to decrypt the data in a protected space within the hardware processor, limiting the possibility for other parts of the system to access such data in clear text. An end-to-end hardware implementation of an XNN with a secure enclave will be rather resilient to most forms of data attacks.

In privacy preserving solution (iii.), federated learning, an AI model is jointly trained across various decentralized devices that hold only local data samples. The local data samples are not shared with other devices, thus limiting, but not completely eliminating, the privacy risk involved. XNNs are ideally suited to a decentralized or federated implementation, and can be implemented in a straightforward manner, for example, in IoT or edge computing applications where messaging options are limited or constrained by the network topology, such as in a mesh network.

In privacy preserving solution (iv.), homomorphic encryption, or homomorphic computing, a protocol such as the Cheon-Kim-Kim-Song (CKKS) protocol, Brakerski-Gentry-Vaikuntanathan (BGV), Brakerski/Fan-Vercauteren (BFV), or the FHEW Fully Homomorphic Encryption protocol (sometimes given the bacronym "Fastest Homomorphic Encryption in the West"), are used to allow computation on encrypted data without either decrypting the data and also, optionally, using an encrypted AI model. Homomorphic encryption is widely applicable to applications where data privacy is paramount and making use of such private data is usually already complex due to regulations, the significance of the data, and security concerns. Homomorphic encryption is also important for applications where the AI model itself and its learned information may need to remain encrypted and protected from the data users or owners themselves. Most homomorphic encryption schemes are based on ring algebraic structures, which allow addition-like and multiplication-like operations to be performed, while admitting neutral elements for both operations, for example, natural integers. Homomorphic computing usually uses an integer polynomial expression to encrypt information and be able to perform computations on the encrypted polynomial. In an exemplary embodiment, data may be homomorphically encrypted and, depending on the specific application, the XNN model itself may also be homomorphically encrypted. In an exemplary embodiment using homomorphically encrypted data and a homomorphically encrypted XNN, utilizing CKKS, a secret key and a public key are generated. The public key is used for encryption and can be shared, while the private key is used for decryption and must be kept secret, for example, in a secure hardware enclave or similar implementation solution. CKKS, and many other homomorphic encryption schemes, are founded upon the principles of the Learning with Error (LWE) problem, where noisy pairs of data tuples are distinguished from truly random ones, with the noise generally being provided via the public key. The Ring Learning with Error (RLWE) problem is a variant of LWE on algebraic rings. RLWE needs much smaller keys and calculates operations fast enough to allow for practical implementations. Problems generally arise when doing multiplication of encrypted data with encrypted data, which would be a common operation in the prediction network 120 and conditional network 110 of an encrypted XNN. Essentially, the size of the encrypted data would increase at each multiplication step, making simple RLWE schemes infeasible to use in practice. A practical solution to this would be to use a relinearization technique and an evaluation key, which can be made public, which is applied immediately after each multiplication of encrypted data. A further problem is that after relinearization, the amount of noise increases with the number of multiplications that need to be performed. A technique called rescaling is used to manage the overall noise that is allowed in each multiplication step or layer within a neural network. For a practical implementation, the number of multiplications that will be performed will need to be known in advance, as this will impact the size of polynomial degree used for the encryption. XNNs have an inherent advantage in such a homomorphic encryption application, being Wide Neural Networks (WNNs) instead of Deep Neural Networks (DNNs). The number of multiplications needed in an XNN is thus significantly lower than for typical neural networks. Additionally, the precise function and significance of each neuron and connection in an XNN are precisely known in advance, allowing for homomorphic encryption of the XNN weights to be performed selectively on the model. In exemplary embodiments where only the data is homomorphically encrypted, further optimizations are possible in practice, giving white-box XNNs an inherent advantage for such applications. XNNs can also be readily integrated with homomorphic computing libraries, including but not limited to the HEAAN, SEAL, HElib and PALISADE libraries. The choice and type of functions within the XNNs can also make them more efficiently implementable for such privacy preserving applications, for example, by utilizing linear polynomial transformations of reasonably low degree whenever possible to further minimize the number of multiplications that are necessary to perform. XNNs also have the added advantage of being able to build up an encrypted explanation based on the encrypted answer, which can then be decoded safely in the recipient's secure environment. The application of homomorphic computing with hardware based secure XNN implementations presents a practical way of implementing highly secure AI models that may be utilized in environments and applications involving highly sensitive data and/or models without needing to establish much trust, if any, between the parties involved.

The following are a few exemplary embodiments of hardware XNNs which may be seen as different variants of XNNs, implemented in hardware.

Convolutional XNNs (CNN-XNNs) allow convolutional layers to be seamlessly integrated with XNNs in order to process multi-dimensional data including images, 3D data and other signal processing that is amenable to convolutional feature identification, transformation, and extraction. Exemplary hardware implementations and applications of CNN-XNNs may include computer vision systems, autonomous vehicles and devices, robots, manufacturing devices and industrial automation systems. FIG. 7 shows a high-level architecture of CNN-XNNs. In the exemplary embodiment in FIG. 7, the general XNN architecture 106 (as illustrated in FIG. 1) receives input from one or more convolutional layers 104. The original input is given to the input layer 102, which then passes the data to the convolutional layers 104 where the input is convoluted. The result of the convolutional layer may be a list of features identified from the input. The rest of the XNN general architecture may operate the same as the one described in FIG. 1.

Capsule XNNs (CAP-XNNs) preserve hierarchical information captured during the convolution steps by a CNN-XNN. Exemplary hardware implementations and applications of CAP-XNNs are similar to those of CNN-XNNs.

Text XNNs (T-XNNs) are a variant of XNNs that can handle text processing and textual data including syntactic and semantic information. T-XNNs may incorporate techniques like word2vec and end-to-end processing for textual feature engineering, etc. Exemplary hardware implementations and applications of T-XNNs may include dedicated database query accelerator hardware, information retrieval devices, specialized text indexing and processing hardware, smartphones and any hardware that needs to process text.

Speech XNNs (S-XNNs) are an extension of XNNs for speech recognition and generation, adding an explanation to speech recognition by inserting an XNN or alternatively using an induced model as part of the speech recognition solution. Exemplary hardware implementations and applications of S-XNNs may include computer audio systems, intelligent microphones and audio recording/capture systems and applications where a speech-to-text or speech-based control system is needed, like in aviation or other applications where a human operator has a high level of multi-tasking needs or needs to operate without taking their hands off vehicle or machine controls.

Dialogue and Conversational XNNs (QA-XNNs) automate conversational, dialogue and Question Answering (Q&A) systems in combination with XNNs. Given a specific question, an explainable neural network outputs the answer along with an explanation why such answer has been specified. Exemplary hardware implementations and applications of QA-XNNs may include edge deployed chatbots and robots, interactive devices and accelerator hardware that speeds up QA and interaction tasks between humans and machines.

Predictive and Recurrent XNNs (PR-XNNs) add an element of time and or sequence to the input and to the output. Such XNNs can match an input sequence and identify its trend while outputting and forecasting possible outputs together with the explanation for each possible output. Such XNNs may utilize recurrence in the explanation and have parts of the explanation refer to itself in a modular manner. The specific type of predictive architecture will give rise to different variants of PR-XNNs, for example and long short-term memory (LSTM) PR-XNN or a gated recurrent unit (GRU) PR-XNN. Exemplary hardware implementations and applications of PR-XNNs may include Digital Signal Processing (DSP) systems, advanced machinery control systems that use explanations as part of the feedback and error control cycle and control engineering in general. Hardware PR-XNNs can be deployed in various advanced machinery and systems that require predictions especially in real-time or quasi-real-time on the edge or difficult environments, such as space, underwater or underground systems or those that have to operate with minimal or no communication with the outside world or that face significant delays in signaling such as marine systems or space exploration systems, such as AI robots that may be deployed on the Moon, Mars, asteroids and other celestial objects.

PR-XNNs add contextual positional information in the conditional and prediction networks of an XNN. This contextual positional information may also form part of the output if required, depending upon the specific application and implementation. The contextual positional information may also be added to the matched answer and explanation pairs, as it may be necessary to precisely distinguish PR-XNN output as part of a sequence of output items rather than a single output item.

PR-XNNs may have some form of recurrence relations in the prediction network, and to a lesser extent may also include recurrence relations in the conditional network. The recurrence relations may be learnt during the PR-XNN initialization step from the original predictor model. For example, if the original predictor model is an LSTM network, the recurrence relations may reflect the LSTM behavior as part of the underlying explanation given by the PR-XNNs.

In one exemplary embodiment, a practical implementation may completely replace the original model; in such a configuration, in the previous example, the LSTM model may be implemented as part of the prediction network of the PR-XNN. Alternatively, in another exemplary embodiment, the original predictor may be placed either before or after the input layer of an XNN. When the original predictor is placed before the input layer of an XNN, the resulting PR-XNN may treat the output of the original predictor as a sequence of input features, just like any other black-box predictor model that is induced to a white-box XNN. When the original predictor model is placed after the input layer of an XNN, the resulting PR-XNN may have extra data that ensures that any explanation coefficients are passed through the predictor model. For example, if an LSTM is placed in between the input layer and the conditional and prediction networks of an XNN, or an LSTM is incorporated as part of the prediction network of an XNN, the LSTM model needs to pass through the explanation coefficients in order to make sure that the resulting PR-XNN is still a white-box. This passthrough innovation allows a PR-XNN to remain a white-box even if an element in its prediction is effectively a black-box or a grey-box with a mix of white-box elements and black-box structure.

PR-XNNs can also incorporate an LSTM or similar model after their output layer, allowing the LSTM to learn to predict the explanation itself. It may be contemplated that similar models, such as RNNs, Transformer, Bayesian Networks, Markov Models, and other suitable models may be utilized instead of an LSTM. Such a combination of LSTMs or other similar models with PR-XNNs can lead to efficient new systems that not only generate an explanation from a single data item and/or ordered or unordered sequence of data items, but also be capable of predicting possible explanations. This capability of PR-XNNs makes them particularly suitable for industrial applications that need to anticipate the consequences of planned actions prior to actually executing them.

For example, in an industrial robotics manufacturing application involving a robot arm, the predicted explanations for a set of movement commands can be used to determine whether such movement commands will lead to an unsafe situation for any human operators, living objects or inanimate equipment that may be in the proximity of such robotic arm. PR-XNNs can thus bring forth a new set of capabilities in industrial and commercial and non-commercial applications that allow safety to be part of the control loop of automated machinery, apparatus, and systems.

Another example of the practical implementation and advantages of a PR-XNN is to anticipate the behavior and subsequent consequences of an autonomous vehicle, including, but not limited to, autonomous air, land, sea, underwater and space indoor and outdoor vehicles. Using a PR-XNN, an autonomous driverless car, for example, may determine that in one of its anticipated future explanations there is a reference to a person—or a particular type of person associated with different kinds or magnitudes of risks, such as a child that may be more likely to run into traffic than an adult—being potentially hit by the driverless car. When the safety control system in the driverless car detects such anticipated references, it may take an appropriate safety related action, such as to switching the car to a safer driving mode, slowing down, or turning on some higher resolution sensor to better resolve the future possibilities prior to them actually happening, for example. PR-XNNs may allow practical systems to safely operate automated machinery based on the anticipation and prediction of consequences. The ability to guarantee a safe mode of operation of machinery and robots, especially machinery and robots which interact with people, is a major unresolved problem which PR-XNNs may solve to a large extent.

Video XNNs (V-XNNs) are a combination of CNN-XNNs and PR-XNNs whereby a sequence of images (frames) is used to predict, anticipate, and explain what is likely to happen in future frames. Video XNNs are not limited to 2D video. A 3D data stream processed by the CNN-XNN will enable the XNNs to process and explain 3D data. Exemplary hardware implementations and applications of V-XNNs may include stereoscopic vision systems, LIDAR, RADAR, SONAR, and any other application that needs to be aware of its surroundings and anticipate and explain its past, present, and future state.

Exemplary applications of V-XNNs may be found in medical devices that perform continuous scans of a patient, such as during operations involving fluoroscopy equipment that constantly scans patients with X-Rays while a surgeon is operating. V-XNNs in such a situation may provide quasi-real-time feedback to the surgeon of any diagnosis together with its explanation, which may be especially important in a time critical situation such as a surgical intervention. Another exemplary application of a V-XNN may be implemented for troubleshooting industrial machinery, where scans are constantly taken, and anomalies must be detected. Subsequent interventions and troubleshooting steps may force the system to adapt its answers and explanations to new situations, with the resulting explanations making V-XNNs a more suitable solution than other solutions that do not give an explanation.

It may be contemplated that V-XNNs may be combined with other XNN variants like a QA-XNN to implement interactive solutions that need to have situational awareness combined with interventions and actions that affect the physical world, enabling the system to adapt to changing circumstances while all the time maintaining its capability to explain itself. Combining such a system with a PR-XNN also gives it the capability to anticipate the future to some extent, giving it further useful capabilities that are beyond the scope of current black-box neural network-based systems.

Explainable Generative Adversarial Networks (XGANs) extend the XNN architecture concept to Generative Adversarial Networks (GANs). Exemplary hardware implementations and applications of XGANs may include fast image generation systems, advanced manufacturing and customization systems and fast object creation and customization systems. For example, an XGAN enabled CNC manufacturing system may allow a factory to create customized construction material for a specific order that has unique patterns or has been customized for a particular style, without needing expensive human designs to be produced for each manufacturing batch.

Explainable Reinforcement Learning using XNNs may utilize XNNs as part of the reinforcement learning (RL) training method including the generation of explanations in the action plan and world model components of the RL system. Utilization of the explanations themselves as part of the cost and reward functions gives rise to eXplainable Reinforcement Learning (XRL). Exemplary hardware implementations and applications of XRLs may include advanced autonomous robots and autonomous devices that adapt to their environment intelligently while remaining capable of explaining the basis of their actions. Hardware XRLs may also lead to advanced safety solutions that guarantees safe operation of autonomous systems that may interact with people in a potentially dangerous space, for example, in a manufacturing scenario where a robot is handling devices that may harm people if it inadvertently moves in close proximity to them during operations or performs an operation that is predicted to cause harm to people or other objects, like cutting through a column that is holding up a platform with people currently still on it. Such an XRL system will be able to correctly detect and predict a future situation that will lead to it harming people and thus stop or modify its operational steps to avoid and prevent such harm from happening in the first place. If a resolution cannot be implemented automatically, the XRL system will be able to explain the reason why it took certain avoidance actions to human operators.

Explainable Auto-Encoders (XAE) and Auto-Decoders (XAD) extends the XNN architecture concept to auto-encoders and auto-decoders enabling explanations to be generated, processed, and be incorporated in the encoding and/or decoding processes. Exemplary hardware implementations and applications of XAEs and XADs may include telecom and network devices together with cybersecurity devices that may need to process large quantities of data that necessitates hardware implementations.

Casual XNNs (C-XNNs) extend XNNs to integrate with causal logic models giving the explanations the power of causality. Exemplary hardware implementations and applications of C-XNNs may include on-board control devices that can take quick decisions entirely offline and in situations where large number of alternatives need to be considered quickly to choose the best next action.

All of the above variants of hardware XNNs remain compatible with the generic XNN architecture, meaning that they can be mixed and matched in various combinations as part of a larger and more sophisticated XNN deployment that involves a combination of both software and hardware and hybrid XNNs. For example, a hardware C-XNN can be combined with a hardware CNN-XNN or a hardware V-XNN to provide casual in-situ explanations for an autonomous vehicle while a data center-based C-XNN can then be used to provide higher level and more sophisticated explanations than can be generated on the edge.

Some XNN variants such as PR-XNNs are also capable of outputting an ordered sequence of triggers and/or suggested actions, making them highly suitable for goal/plan/action systems, robotic systems, RL systems, etc. especially when implemented in hardware only form for deployment in edge and offline contexts.

XNNs can also be used alone or in combination with other XNNs and variants of XNNs to utilize the resulting answers and their explanation(s) to act as a trigger(s) for a suggested action or set of actions in a general goal/plan/action system. Hardware XNN action triggers using a wide variety of possible means, including but not limited to electric, optical, mechanical relays, switches, bus systems, control networks, network devices and hard-wired signaling mechanisms can be used in a wide variety of industrial and domestic applications. This feature of hardware XNNs makes it practical and easy to integrate them within larger deployments and hardware or hybrid software-hardware systems. In such deployments XNNs may offer significant control input or add particular desired behavior to the overall system.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for an artificial neural network comprising a plurality of layers that is implemented by hardware as a combination of multi-function hardware comprising computer program code and fixed-function hardware comprising at least one hardware circuit and that is interpretable and explainable, comprising:
    an input layer configured to receive an input and identify one or more input features;
    a conditional network, comprising:
        a conditional layer configured to model the input features based on a plurality of partitions, wherein each partition in the plurality of partitions comprises a rule in a plurality of rules, said rule being uniquely associated with at least one partition;
        an aggregation layer configured to aggregate the plurality of rules into one or more aggregated partitions, wherein aggregating the plurality of rules comprises concatenating a first vector or transform associated with a first rule and a second vector or transform associated with a second rule, and generating an aggregated partition based on a concatenated vector or transform; and
        a switch output layer configured to selectively pool the one or more aggregated partitions from the aggregation layer with the plurality of partitions from the conditional layer by connecting multiple partitions, including the one or more aggregated partitions and the plurality of partitions, with a switch designating a set of partitions to activate;
    a prediction network, comprising:
        a feature generation and transformation network comprising one or more transformation neurons configured to apply one or more transformations to the input features;
        a fit layer configured to combine features which have been transformed by the feature generation and transformation network to identify one or more coefficients related to at least one of: one or more features and the plurality of partitions;
        a value output layer configured to analyze the one or more coefficients and configured to output a value related to at least one of the one or more features or the plurality of partitions; and
    an output layer configured to generate an output which is interpretable and explainable by at least one of a machine program or a human;
    wherein at least one layer is implemented in the fixed-function hardware comprising the at least one hardware circuit;
    wherein each of the one or more partitions forms at least one local model, each local model in the at least one local model particularized to one feature in the one or more features, and wherein a combination of local models forms a global model;
    wherein one or more execution paths throughout the partitions are identifiable by an external process;
    wherein the plurality of rules and one or more coefficients includes at least one static rule or coefficient and at least one dynamic rule or coefficient, wherein the at least one static rule or coefficient is directly hard-coded into the at least one hardware circuit and unchangeable by the neural network, and wherein the at least one dynamic rule or coefficient is changeable by the neural network; and
    wherein the system is configured to transform the input to the output, and form an explanation together with the output, in a single feed forward step.

2. The system of claim 1, wherein at least one of the conditional network and the prediction network is implemented as a wide neural network and wherein one of the conditional network and the prediction network are implemented on one or more separate hardware circuits in the at least one hardware circuit; and wherein one or more of: the input layer, the conditional layer, the aggregation layer, the switch output layer, the feature generation and transformation network, the fit layer, the value output layer, and the output layer are each separately implemented on the one or more hardware circuits in communication with one another.

3. The system of claim 1, wherein the output layer is further configured to embed an action trigger on the at least one hardware circuit connected to the output layer, wherein the output of the output layer is configured to activate the action trigger for real-time processing without pausing the system.

4. The system of claim 1 wherein the local models are updated using one or more of Genetic Algorithms (GAs) and Monte Carlo Simulation Methods (MCSM), Particle Swarm Optimization (PSO), Multiple Objective Optimization (MOO), simulated annealing, reinforcement learning, and causal logic models.

5. The system of claim 1, wherein one or more rules or one or more coefficients of the fit layer are identified by a human user.

6. The system of claim 1, wherein the hardware is one or more of a digital electronic circuitry, analog circuitry, a digital-analog hybrid, integrated circuitry, application specific integrated circuits (ASICs), field programmable gate arrays (FPGAs), neuromorphic circuits, optical circuits, optical-electronic hybrid, and quantum computing hardware, wherein quantum computing hardware comprises one or more of: quantum logic specific operators, quantum controlled-not (CNOT) gates, controlled-swap (CSWAP) gates, Ising coupling gates, Pauli gates, Hadamard gates, and Toffoli gates, wherein the quantum computing hardware is configured to combine one or more quantum logic specific operators serially or in parallel.

7. The system of claim 1, further comprising a processor configured to receive an input and configured to produce the output, wherein the input is from one or more sensors, and wherein the output is human or machine readable, wherein the output identifies at least one of a predicted behavior and consequences of the predicted behavior of an external system or an autonomous machinery.

8. The system of claim 1, wherein the at least one static rule or coefficient includes at least one static rule and at least one static coefficient.

9. The system of claim 1, wherein a plurality of identical redundant functions is identified and wherein the identical redundant functions are implemented on a single circuit, wherein the neural network is configured to activate the single circuit when executing the identical redundant functions.

10. The system of claim 1, wherein the system is configured to:
apply a quantization to at least one of the conditional network and the prediction network, and identify a plurality of zero-valued coefficients;
after the plurality of zero-valued coefficients is identified, selectively excluding the identified zero-valued coefficients from implementation on the hardware circuit(s); and
identify one or more redundant local models and merge and optimize the identified redundant local models based on one or more logical circuit merging and optimization decisions such that a set of identical identified redundant local models is implemented as one hardware circuit and as one local model configured to reactivate in place of the one or more redundant local models.

11. The system of claim 1, wherein the output further comprises the explanation and a justification.

12. The system of claim 1, wherein the output layer further produces an output signal, wherein the output signal comprises a set of instructions for performing an action.

13. The system of claim 1, wherein the at least one hardware circuit is one or more of a neuromorphic chip, spintronics, memristor, spiking neurons, or quantum computing hardware.

14. The system of claim 1, wherein each partition is explainable and interpretable, such that each local model formed from the partitions is explainable and interpretable, and the global model formed from the combination of local models is explainable and interpretable.

15. The system of claim 1, wherein the feature generation and transformation layer is configured to apply at least one of a linear transformation and a non-linear transformation, wherein the transformation functions comprise one or more of polynomial expansions, rotations, dimensional scaling, dimensionless scaling, Fourier transforms, integer/real/complex/quaternion/octonion transforms, Walsh functions, state-space transforms, phase-space transforms, Haar and non-Haar wavelets, generalized L2 functions, fractal-based transforms, Hadamard transforms, Type 1 fuzzy logic, Type 2 fuzzy logic, modal transforms, probabilistic transforms, quantum/qubit transforms, knowledge graph networks, categorical encoding, difference analysis, normalization, standardization, scaling, multi-dimensional Bezier curves, recurrence relations, causal operators, gradient descent based transformations, and subsets of an explainable neural network.

16. The system of claim 1, wherein the transformation layer is further configured to perform a plurality of transformations in a transformation pipeline, wherein the transformation pipeline is configured to perform transformations that analyze one or more data sequences according to the value of one or more variables, wherein the data sequences comprise at least one of temporally ordered data sequences and event-driven data.

17. The system of claim 1, wherein the system is further configured to form the partitions, based on the input, by comparing features from the input to a set of localization values and conditions, wherein the localization values and conditions are identified using an internal and/or external process.

18. The system of claim 1, wherein the at least one hardware circuit is configured to operate without a processor or sensors.

19. The system of claim 1, wherein the at least one hardware circuit is created by creating a Hardware Description Language (HDL) or Very High-Speed Integrated Circuits Program (VHSIC) Hardware Description Language (VHDL) description of the rules of the neural network and converting the HDL or VHDL description into an application specific integrated circuit (ASIC).

20. The system of claim 1, wherein the at least one hardware circuit further comprises one or more hard-coded safety rules, wherein the hard-coded safety rules are unchangeable by software and wherein the hard-coded safety rules are configured to perform an action based on a detected future hazard.

21. The system of claim 20, wherein the action comprises shutting down the system.

22. The system of claim 1, wherein the neural network is implemented in hardware as a Fixed Resource Model configured to interface with one or more systems selected from at least one of: a Real Time Operating System and a Robotic Operating System.

23. The system of claim 1, wherein at least one of the layers is implemented as a micro neural network, wherein an activation path comprising a combination of micro neural networks which are activated to produce the output is identified and presented with the output.

24. The system of claim 1, further comprising an encryption layer, wherein the encryption layer is configured to encrypt at least one of the input, the partitions, the rules, and the output, according to a homomorphic encryption protocol, said encryption based on a secure key and a public key; and
wherein the system is configured to execute at least one operation on an encrypted component without decryption of said encrypted component.

25. The system of claim 24, wherein the encryption layer is configured to re-linearize the encrypted data, wherein the encrypted data is rescaled based on a predetermined maximum allowable amount of overall noise.

26. The system of claim 24, wherein the output layer is configured to produce an encrypted output and encrypted explanation, wherein the encrypted output and encrypted explanation are configured to be decrypted in a recipient's secure environment.

27. A computer implemented method for providing, in hardware comprising a combination of multi-function hardware comprising computer program code and fixed-function hardware comprising at least one hardware circuit, an artificial neural network that is explainable and interpretable comprising a plurality of layers, comprising executing on a processor the steps of:

inputting a set of data into an input layer;

partitioning the input based on one or more input features identified in the input, creating a plurality of partitions, wherein each partition in the plurality of partitions comprises a rule in a plurality of rules, said rule being uniquely associated with at least one partition;

aggregating the plurality of rules into one or more aggregated partitions, wherein aggregating the plurality of rules comprises concatenating a first vector or transform associated with a first rule and a second vector or transform associated with a second rule, and generating an aggregated partition based on a concatenated vector or transform;

selectively pooling the one or more aggregated partitions with the plurality of partitions by connecting multiple partitions, including the one or more aggregated partitions and the plurality of partitions, with a switch designating a set of partitions to activate;

applying one or more transformation functions to the partitioned input features, providing a set of transformed features;

combining the transformed features and identifying one or more coefficients corresponding to the transformed features;

compiling one or more equations based on the coefficients and the transformed features;

compiling one or more rules based on the equation and the set of partitions;

implementing at least one of the one or more rules and the one or more equations, applying the equations and rules to the set of input features to obtain an output value; and outputting the output value and generating an explanation of the output value, wherein the explanation accounts for at least one of the coefficients, wherein a single feed forward step is used to transform the set of data input into the input layer into the output value;

wherein each of the one or more partitions forms at least one local model, each local model in the at least one local model particularized to one feature in the one or more features, and wherein a combination of local models forms a global model;

wherein one or more execution paths throughout the set of partitions are identifiable by an external process; and wherein the one or more rules and one or more coefficients includes at least one static rule or coefficient and at least one dynamic rule or coefficient, wherein the at least one static rule or coefficient is directly hard-coded into the at least one hardware circuit and unchangeable by the neural network, and wherein the at least one dynamic rule or coefficient is changeable by the neural network.

28. The method of claim 27, further comprising embedding an action trigger on at least one hardware type so that the outputted computation serves as the action trigger for real-time processing without pausing the system.

29. The method of claim 27, wherein the at least one hardware circuit comprises one or more of an application specific integrated circuit (ASIC), field programmable gate array (FPGA), a Spintronic circuit, a neuromorphic computing chip, acceleration hardware, optical computing hardware, mechanical relays, low-powered chip, network device, hard-wired signaling mechanism, memristor circuit, firmware chip, or a quantum computing architecture.

30. The method of claim 27, further comprising: receiving, by a user, a user input comprising at least one of a rule and a coefficient, updating the compiled rules based on the user input, and implementing a rule corresponding the user input in the at least one hardware circuit configured to be unchangeable by the neural network, wherein the rule corresponding to the user input is unchangeable by software.

\* \* \* \* \*